(12) United States Patent
Akao

(10) Patent No.: US 12,167,180 B2
(45) Date of Patent: Dec. 10, 2024

(54) INFORMATION PROCESSING DEVICE, INFORMATION PROCESSING METHOD, PROGRAM, PROJECTION DEVICE, AND INFORMATION PROCESSING SYSTEM

(71) Applicant: SONY GROUP CORPORATION, Tokyo (JP)

(72) Inventor: Masato Akao, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 386 days.

(21) Appl. No.: 17/618,633

(22) PCT Filed: Jun. 8, 2020

(86) PCT No.: PCT/JP2020/022482
§ 371 (c)(1),
(2) Date: Dec. 13, 2021

(87) PCT Pub. No.: WO2020/255766
PCT Pub. Date: Dec. 24, 2020

(65) Prior Publication Data
US 2022/0239876 A1 Jul. 28, 2022

(30) Foreign Application Priority Data
Jun. 20, 2019 (JP) .................... 2019-114830

(51) Int. Cl.
*G03B 21/14* (2006.01)
*H04N 9/31* (2006.01)

(52) U.S. Cl.
CPC ......... *H04N 9/3185* (2013.01); *G03B 21/147* (2013.01); *H04N 9/3147* (2013.01); *H04N 9/3194* (2013.01)

(58) Field of Classification Search
CPC .... G03B 21/147; G03B 21/14; H04N 9/3185; H04N 9/3194
See application file for complete search history.

(56) References Cited

U.S. PATENT DOCUMENTS

| 2006/0158545 A1 | 7/2006 | Hirai |
| 2008/0136976 A1 | 6/2008 | Ajito |

(Continued)

FOREIGN PATENT DOCUMENTS

| CN | 101019423 A | 8/2007 |
| CN | 103108147 A | 5/2013 |

(Continued)

*Primary Examiner* — Ryan D Howard
(74) *Attorney, Agent, or Firm* — Paratus Law Group, PLLC

(57) ABSTRACT

There is provided an information processing device, an information processing method, a program, a projection device, and an information processing system capable of correcting distortion of a projection image by use of any image capturing device. The information processing device detects corresponding points on a projection image and a plurality of captured images on the basis of the projection image and the plurality of captured images, the projection image being projected on a projection surface by a projection device, the plurality of captured images having been obtained by image capturing of the projection image at a plurality of image capturing positions, estimates image capturing parameters including the plurality of image capturing positions and attitudes during image capturing at each of the image capturing positions and projection parameters including a position and an attitude of the projection device on the basis of corresponding point information indicating a relationship between the corresponding points, generates correction data used for geometric correction of an input image on the basis of the corresponding point information, the image capturing parameters, and the projection param- (Continued)

eters, and transmits the correction data. The present technology can be applied to an information processing device that controls projection of a projector.

20 Claims, 32 Drawing Sheets

(56) References Cited

U.S. PATENT DOCUMENTS

| | | |
|---|---|---|
| 2011/0032492 A1 | 2/2011 | Nara |
| 2013/0107227 A1 | 5/2013 | Tsuji |
| 2015/0302560 A1 | 10/2015 | Sumiyoshi |
| 2016/0104314 A1 | 4/2016 | Nakazato |
| 2016/0142691 A1 | 5/2016 | Kobiki |
| 2016/0180527 A1 | 6/2016 | Endo |
| 2017/0118451 A1 | 4/2017 | Sakai |
| 2017/0180644 A1 | 6/2017 | Alibay |

FOREIGN PATENT DOCUMENTS

| | | | |
|---|---|---|---|
| CN | 108702477 A | 10/2018 | |
| CN | 109151418 A | 1/2019 | |
| CN | 109163708 A | 1/2019 | |
| JP | 2006-033357 A | 2/2006 | |
| JP | 2006-140831 A | 6/2006 | |
| JP | 2006201494 A | 8/2006 | |
| JP | 2007-288295 A | 11/2007 | |
| JP | 2009-206798 A | 9/2009 | |
| JP | 2009302814 A | 12/2009 | |
| JP | 2011-102728 A | 5/2011 | |
| JP | 2011242134 A | 12/2011 | |
| JP | 2013-172444 A | 9/2013 | |
| JP | 2014-160998 A | 9/2014 | |
| JP | 2014178265 A | 9/2014 | |
| JP | 2015128242 A | 7/2015 | |
| JP | 2015-171077 A | 9/2015 | |
| JP | 2015192310 A | 11/2015 | |
| JP | 2016-015558 A | 1/2016 | |
| JP | 2017-092756 A | 5/2017 | |
| JP | 2018207252 A | 12/2018 | |
| TW | 201124789 A | 7/2011 | |
| WO | WO 2006/030501 A1 | 3/2006 | |
| WO | WO-2017154628 A1 * | 9/2017 | ............ G06T 7/60 |
| WO | WO-2018142743 A1 | 8/2018 | |
| WO | WO-2019111704 A1 | 6/2019 | |

* cited by examiner

FIG. 1
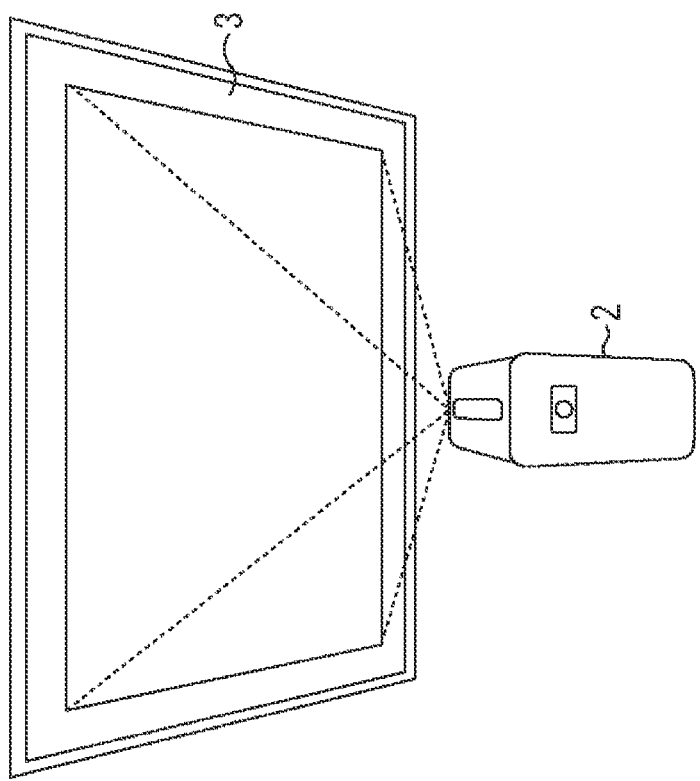
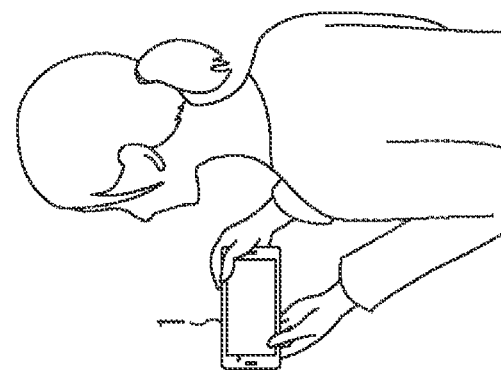

FIG. 23
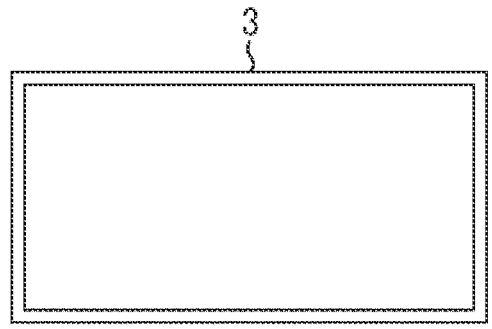
A
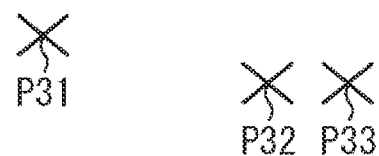
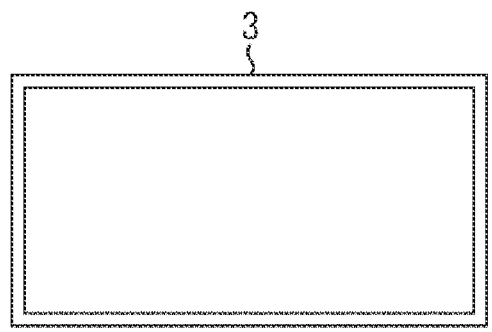
B
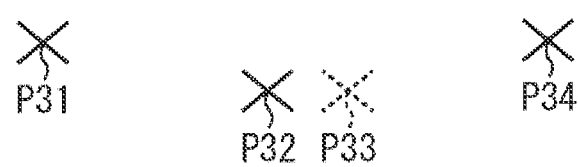

INFORMATION PROCESSING DEVICE, INFORMATION PROCESSING METHOD, PROGRAM, PROJECTION DEVICE, AND INFORMATION PROCESSING SYSTEM

CROSS REFERENCE TO PRIOR APPLICATION

This application is a National Stage Patent Application of PCT International Patent Application No. PCT/JP2020/022482 (filed on Jun. 8, 2020) under 35 U.S.C. § 371, which claims priority to Japanese Patent Application No. 2019-114830 (filed on Jun. 20, 2019), which are all hereby incorporated by reference in their entirety.

TECHNICAL FIELD

The present technology relates to an information processing device, an information processing method, a program, a projection device, and an information processing system, and more particularly, to an information processing device, an information processing method, a program, a projection device, and an information processing system capable of correcting distortion of a projection image by use of any image capturing device.

BACKGROUND ART

In a projection image, which is an image projected from a projector, trapezoidal distortion usually occurs according to a relative positional relationship between the projector and a projection surface. Non-linear distortion reflecting local unevenness or twist of the projection surface may occur in the projection image.

In order to correct such distortion, various technologies have been proposed in which a camera of a mobile phone captures an image of the projection image on the projection surface to observe the state of the distortion, and correction to cancel the distortion is performed on an image before the projection. Camera parameters of the mobile phone are used to perform the correction to cancel the distortion.

CITATION LIST

Patent Document

Patent Document 1: Japanese Patent Application Laid-Open No. 2006-33357
Patent Document 2: Japanese Patent Application Laid-Open No. 2013-172444
Patent Document 3: Japanese Patent Application Laid-Open No. 2014-160998

SUMMARY OF THE INVENTION

Problems to be Solved by the Invention

In the above-described technologies, a mobile phone whose camera parameters are known is usually used as the mobile phone that captures an image of the projection surface. That is, the state of the distortion can be observed only from a captured image captured by use of a specific model of mobile phone or a calibrated mobile phone.

The present technology has been made in view of such a situation, and makes it possible to correct distortion of a projection image by use of any image capturing device.

Solutions to Problems

An information processing device according to a first aspect of the present technology includes: a detection unit that detects corresponding points on a projection image and a plurality of captured images on the basis of the projection image and the plurality of captured images, the projection image being projected on a projection surface by a projection device, the plurality of captured images having been obtained by image capturing of the projection image at a plurality of image capturing positions; an estimation unit that estimates image capturing parameters including the plurality of image capturing positions and attitudes during image capturing at each of the image capturing positions and projection parameters including a position and an attitude of the projection device on the basis of corresponding point information indicating a relationship between the corresponding points; a generation unit that generates correction data used for geometric correction of an input image on the basis of the corresponding point information, the image capturing parameters, and the projection parameters; and a transmission unit that transmits the correction data.

A projection device according to a second aspect of the present technology includes: a projection unit that projects a projection image on a projection surface; a reception unit that receives correction data used for geometric correction of an input image, the correction data having been transmitted from an information processing device that detects corresponding points on the projection image and a plurality of captured images obtained by image capturing of the projection image at a plurality or image capturing positions on the basis of the projection image and the plurality of captured images, estimates image capturing parameters including the plurality of image capturing positions and attitudes during image capturing at each of the image capturing positions and projection parameters including a position and an attitude of the projection device on the basis of corresponding point information indicating a relationship between the corresponding points, and generates the correction data on the basis of the corresponding point information, the image capturing parameters, and the projection parameters; and a generation unit that generates a corrected image obtained by the input image being geometrically corrected on the basis of the correction data.

The information processing device according to the first aspect of the present technology detects the corresponding points on the projection image and the plurality of captured images on the basis of the projection image and the plurality of captured images, the projection image being projected on the projection surface by the projection device, the plurality of captured images having been obtained by image capturing of the projection image at the plurality of image capturing positions, estimates the image capturing parameters including the plurality of image capturing positions and the image capturing attitude at each of the image capturing positions and the projection parameters including the position and the attitude of the projection device on the basis of the corresponding point information indicating the relationship between the corresponding points, generates the correction data used for geometric correction of the input image on the basis of the corresponding point information, the image capturing parameters, and the projection parameters, and transmits the correction data.

The projection device according to the second aspect of the present technology projects the projection image on the projection surface, receives the correction data used for geometric correction of the input image, the correction data having been transmitted from the information processing device that detects the corresponding points on the projection image and the plurality of captured images obtained by image capturing of the projection image at the plurality of image capturing positions on the basis of the projection image and the plurality of captured images, estimates the image capturing parameters including the plurality of image capturing positions and the image capturing attitude at each of the image capturing positions and the projection parameters including the position and the attitude of the projection device on the basis of the corresponding point information indicating the relationship between the corresponding points, and generates the correction data on the basis of the corresponding point information, the image capturing parameters, and the projection parameters, and generates the corrected image obtained by the input image being Geometrically corrected on the basis of the correction data.

BRIEF DESCRIPTION OF DRAWINGS

FIG. 1 is a diagram illustrating a configuration example of as information processing system according to an embodiment of the present technology.

FIG. 23 is a diagram illustrating an example of image capturing angles.

MODE FOR CARRYING OUT THE INVENTION

Figure 2:
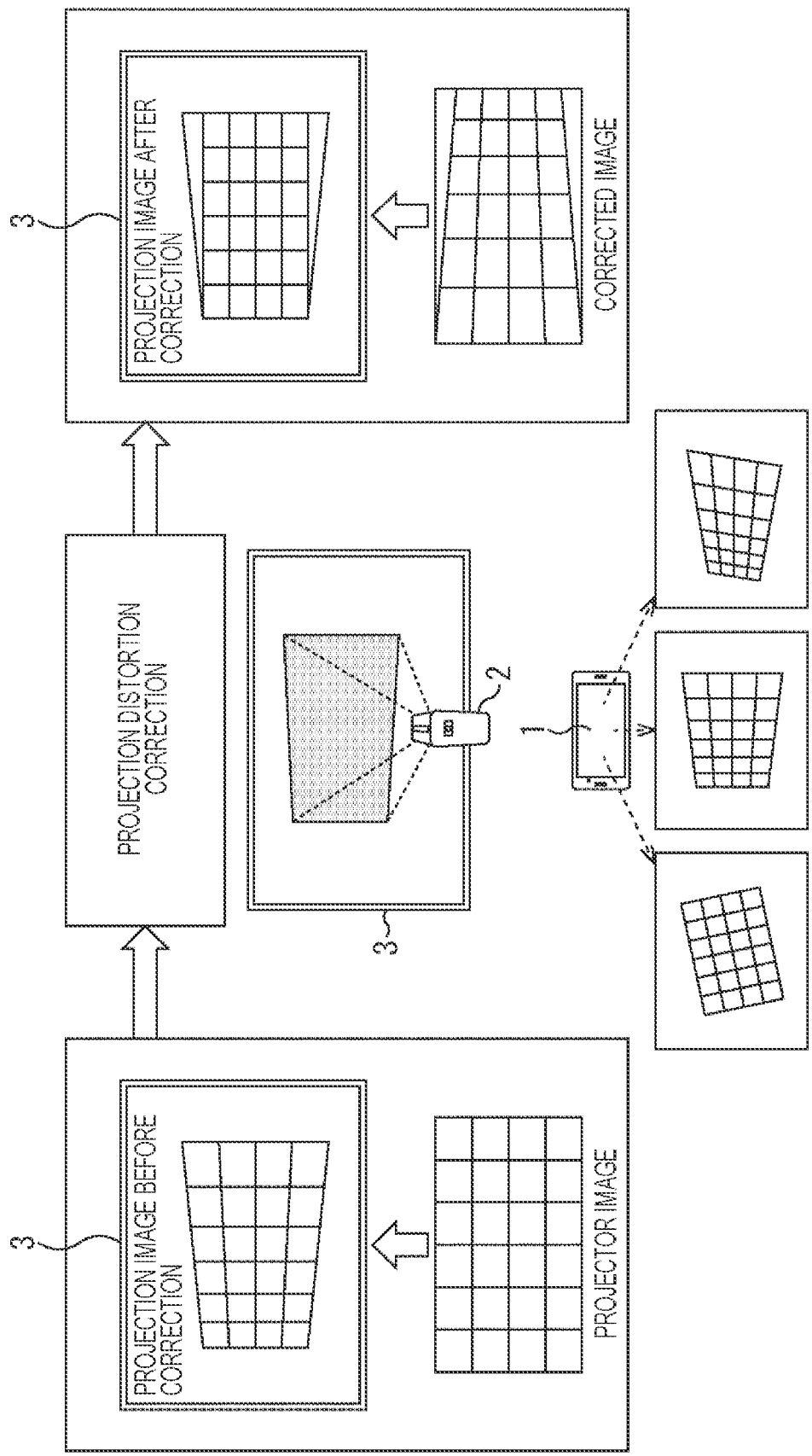
FIG. 2 is a diagram illustrating an overall processing flow of the information processing system.

Hereinafter, modes for carrying out the present technology will be described. The description will be made in the following order.
1. Projection Distortion Correction Application
2. Configuration of Each Device
3. Operation of Each Device
4. Second Embodiment (Example of Estimation by Gradually Increasing Number of Captured Images)
5. Third Embodiment (Example of Processing When Projection Distortion Correction Is Retried)
6. Fourth Embodiment (Example of Guide for Image Capturing Positions)
7. Fifth Embodiment (First Example of User Designation of Correction Portion)
8. Sixth Embodiment (Second Example of User Designation of Correction Portion)
9. Seventh Embodiment (Example of Estimation by Image Capturing of Divided Pattern Images)
10. Others Projection Distortion Correction Application FIG. 1 is a diagram illustrating a configuration example of as information processing system according to an embodiment of the present technology.

The information processing system of FIG. 1 includes a mobile terminal 1 as an information processing device such as a smartphone and a projector 2 as a projection device. A projection surface 3 is provided in front of the projector 2 placed on a flat surface such as a floor surface or a top plate of a desk.

A user can view a projection image, which is an image projected on the projection surface 3 by the projector 2. For example, moving image content stored in an internal memory, moving image content received via a network, or the like is reproduced by the projector 2, and an image of the moving image content is projected. The image of the moving image content reproduced by the mobile terminal 1 may be transmitted to the projector 2 via wireless communication and projected.

Here, the projection surface 3 has unevenness formed thereon. In a case where correction or the like is not performed before the projection, distortion occurs in the projection image projected on the projection surface 3, which is an uneven surface, by the projector 2.

In the information processing system of FIG. 1, the mobile terminal 1 generates correction data used for geometric correction of an input image at a predetermined timing such as before the image of the moving image content is projected. The correction data generated by the mobile terminal 1 is transmitted to the projector 2.

The projector 2 receives the correction data transmitted from the mobile terminal 1, and performs the geometric correction on the input image, which is an image obtained by, for example, reproducing the moving image content, on the basis of the correction data. The projector 2 projects a corrected image, which is the input image after the geometric correction. The projection image projected on the basis of the corrected image is an image in which the distortion due to the unevenness of the projection surface 3 has been corrected.

A projection distortion correction application, which is an application for generating the correction data used for the geometric correction of the input image, is installed in the mobile terminal 1. The user activates the projection distortion correction application, and performs, as preparation before viewing the moving image content, an operation such as capturing an image of the projection surface 3 according to a guide or the like presented by the projection distortion correction application.

FIG. 2 is a diagram illustrating an overall processing flow of the information processing system.

When the projection distortion correction application is activated, the projector 2 projects an image of a predetermined pattern. For example, the projector 2 projects an image of a dot pattern in which circular dots each having a predetermined diameter are regularly arranged in the entire projection range of the projector 2. Instead of the image of the dot pattern, an image of another known pattern such as a checker pattern may be projected.

As illustrated in the lower center of FIG. 2, the user uses a camera function of the mobile terminal 1 to capture an image of the dot pattern projected by the projector 2 at a plurality of different image capturing positions. The captured images obtained by the image capturing show, for example, a range including the entire dot pattern projected as the projection image on the projection surface 3.

Figure 3:
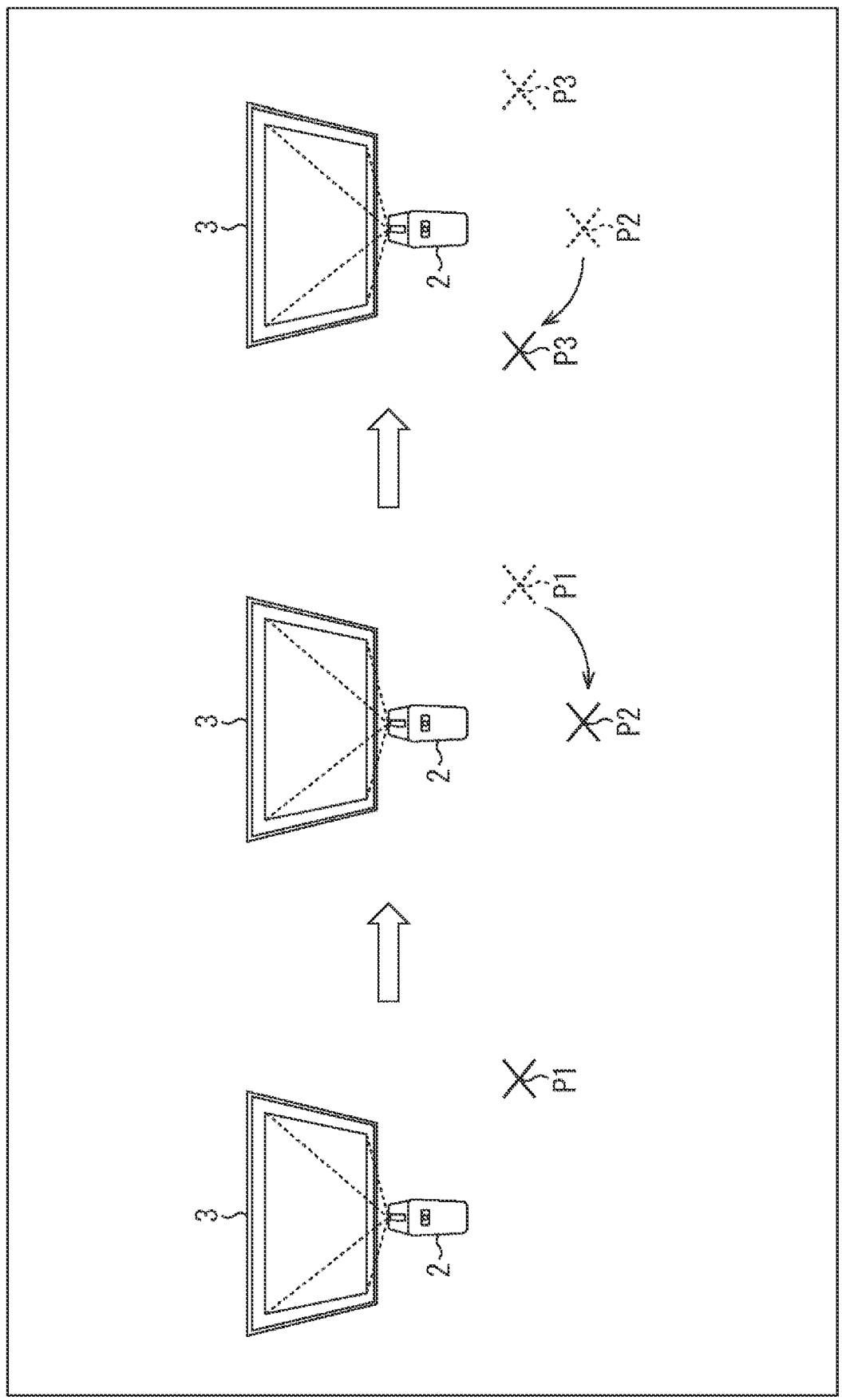
FIG. 3 is a diagram illustrating an example of image capturing positions at which a mobile terminal is used.

FIG. 3 is a diagram illustrating an example of the image capturing positions at which the mobile terminal 1 is used.

As illustrated on the left side of FIG. 3, the user operating the mobile terminal 1 captures an image at any image capturing position P1. In the example of FIG. 3, a position at which the projection surface 3 is viewed from a right oblique direction is the mage capturing position P1. The mobile terminal 1 obtains, as a first captured image, an image obtained by capturing an image of the dot pattern projected on the projection surface 3 by the projector 2 from the right oblique direction.

After the image capturing at the image capturing position P1 is finished, the user moves to an image capturing position P2, which is a position different from the image capturing position P1, as illustrated in the center of FIG. 3, and captures an image. In the example of FIG. 3, a position at which the projection surface 3 is viewed from the front is the image capturing position P2. The mobile terminal 1 obtains, as a second captured image, an image obtained by capturing an image of the dot pattern projected on the projection surface 3 by the projector 2 from the front.

After the image capturing at the image capturing position P2 is finished, the user moves to an image capturing position P3, which is a position different from the image capturing positions P1 and P2, as illustrated on the right side of FIG. 3, and captures an image. In the example of FIG. 3, a position at which the projection surface 3 is viewed from a left oblique direction is the image capturing position P3. The mobile terminal 1 obtains, as a third captured image, an image obtained by capturing an image of the dot pattern projected on the projection surface 3 by the projector 2 from the left oblique direction.

The projection distortion correction application presents a guide for such image capturing to the user.

Figure 4:
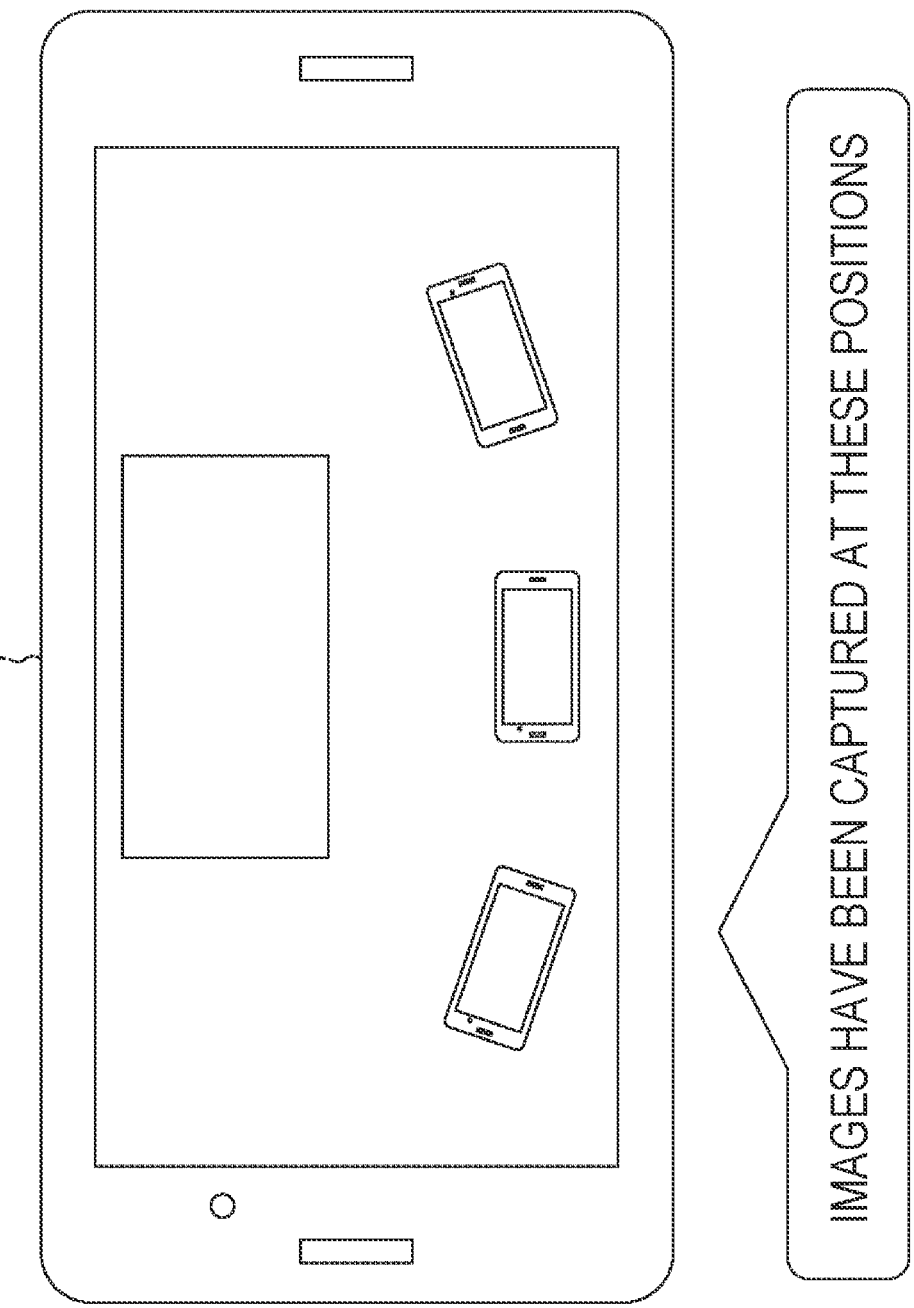
FIG. 4 is a diagram illustrating an example of information serving as a guide for the image capturing positions.

FIG. 4 is a diagram illustrating an example of information serving as the guide for the image capturing positions.

As illustrated in FIG. 4, a display of the mobile terminal 1 displays a screen indicating the position of the projection surface and the positions at which image capturing has been finished. In the example of FIG. 4, the position of the projection surface is displayed by use of an icon having a laterally-long rectangular shape, and each of the positions at which image capturing has been finished is displayed by use of an icon representing the appearance of the mobile terminal 1. The position of the projection surface and the positions at which image capturing has been finished are displayed on the basis of estimation results based on the captured images and the like as described later.

Furthermore, as illustrated in a word balloon of FIG. 4, a speaker of the mobile terminal 1 outputs a voice for explaining display contents or the like.

According to such a guide, the user performs image capturing a plurality of times while changing the image capturing position. Note that the relationship between the position of the projection surface and the positions at which image capturing has been finished is estimated on the basis of three or more captured images after image capturing is performed three or more times. The guide as illustrated in FIG. 4 is presented, for example, in a case where additional image capturing is required after the relationship between the position of the projection surface and the positions at which image capturing has been finished is estimated.

In the example of FIG. 4, the display by the display and the voice are used as guides, but only one of the display and the voice may be used.

The mobile terminal 1 generates the correction data on the basis of the plurality of captured images captured in this manner, and transmits the correction data to the projector 2. Details of the generation of the correction data will be described later.

Returning to the description of FIG. 2, the projector 2 performs projection distortion correction (geometric correction) on the input image on the basis of the correction data generated by the mobile terminal 1. As illustrated on the right side of FIG. 2, an image in which the distortion has been corrected is projected on the basis of the image after the projection distortion correction.

As described above, the information processing system of FIG. 1 can correct the distortion of the projection image on the basis of the captured images captured by use of any mobile terminal. Furthermore, it is possible to correct the distortion of the projection image on the basis of the captured images captured at any image capturing positions.

That is, the user can capture the images used for generation of the correction data without using a specific model of mobile phone or a calibrated mobile phone and without performing image capturing at predetermined positions.

Note that, in the example of FIG. 2, a smartphone is illustrated as the mobile terminal 1, but another device such as a digital camera, a tablet terminal, or a PC can also be used as the mobile terminal 1.

Configuration of Each Device

Figure 5:
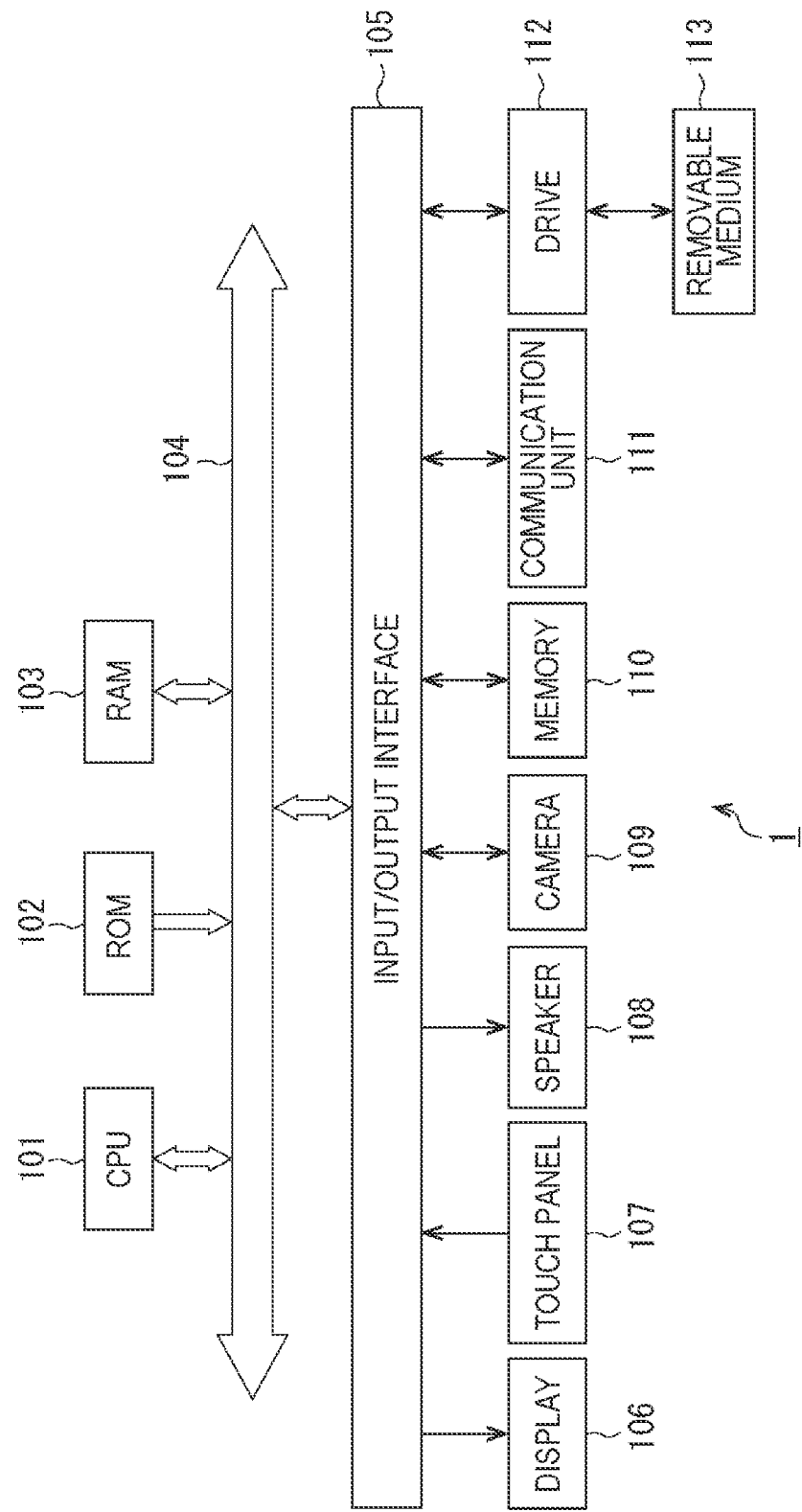
FIG. 5 is a block diagram illustrating a hardware configuration example of the mobile terminal.

FIG. 5 is a block diagram illustrating a hardware configuration example of the mobile terminal 1.

A central processing unit (CP) 101, a read only memory (ROM) 102, and a random access memory (RAM) 103 are connected to each other by a bus 104.

An input/output interface 105 is further connected to the bus 104. A display 106, a touch panel 107, a speaker 108, a camera 109, a memory 110, a communication unit 111, and a drive 112 are connected to the input/output interface 105.

The display 106 includes an LCD, an organic EL display, or the like. The display 106 displays the screen of the projection distortion correction application as described above.

The touch panel 107 detects a users operation on a surface of the display 106 and outputs information indicating contents of the users operation.

The speaker 108 outputs various sounds such as the above-described voice serving as the guide for the image capturing positions.

The camera 109 captures an image according to a users operation and outputs image data.

The memory 110 stores various types of data such as a program executed by the CPU 101.

The communication unit 111 is an interface for wireless communication. The communication unit 111 communicates with an external device such as the projector 2 or a server connected via the Internet. Content reproduced in the information processing system of FIG. 1 may be provided from the server via a network.

The drive 112 drives a removable medium 113 such as a memory card, writes data to the removable medium 113, and reads data stored in the removable medium 113.

Figure 6:
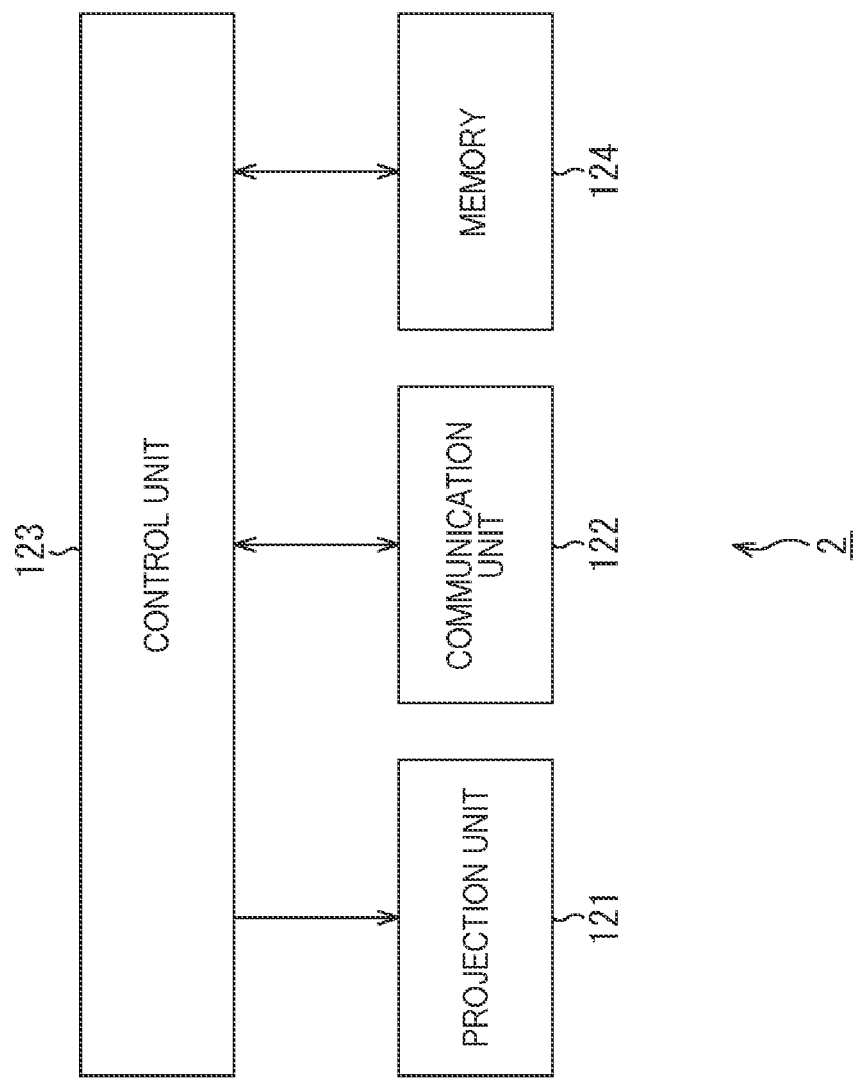
FIG. 6 is a block diagram illustrating a hardware configuration example of a projector.

FIG. 6 is a block diagram illustrating a hardware configuration example of the projector 2.

The projector 2 includes a projection unit 121, a communication unit 122, a control unit 123, and a memory 124.

The projection unit 121 performs processing related to image projection. For example, the projection unit 121 projects the input image output from the control unit 123 according to the control by the control unit 123. A light source of the projection unit 121 is not limited, and may be a light emitting diode (LED), xenon, or the like. Furthermore, laser light may be used as projection light.

The communication unit 122 communicates with an external device such as the mobile terminal 1. The communication unit 122 receives the correction data transmitted from the mobile terminal 1 and outputs the correction data to the control unit 123. An image of content reproduced and transmitted by the external device may be received by the communication unit 122 and output to the control unit 123.

The control unit 123 includes a central processing unit (CPU), a read only memory (ROM), a random access memory (RAM), and the like. The control unit 123 executes a program and controls each processing unit in the projector 2.

For example, the control unit 123 performs geometric correction on the input image using the correction data output from the communication unit 122 to generate the corrected image. The control unit 123 outputs the corrected image to the projection unit 121 and causes the projection unit 121 to project the corrected image.

The control unit 123 performs various types of processing such as causing the memory 124 to hold the input image and the correction data output from the communication unit 122.

The memory 124 stores the input image and the correction data processed by the control unit 123. The memory 124 also stores data of the dot pattern and the like. The data stored in the memory 124 is read by the control unit 123 as appropriate.

Figure 7:
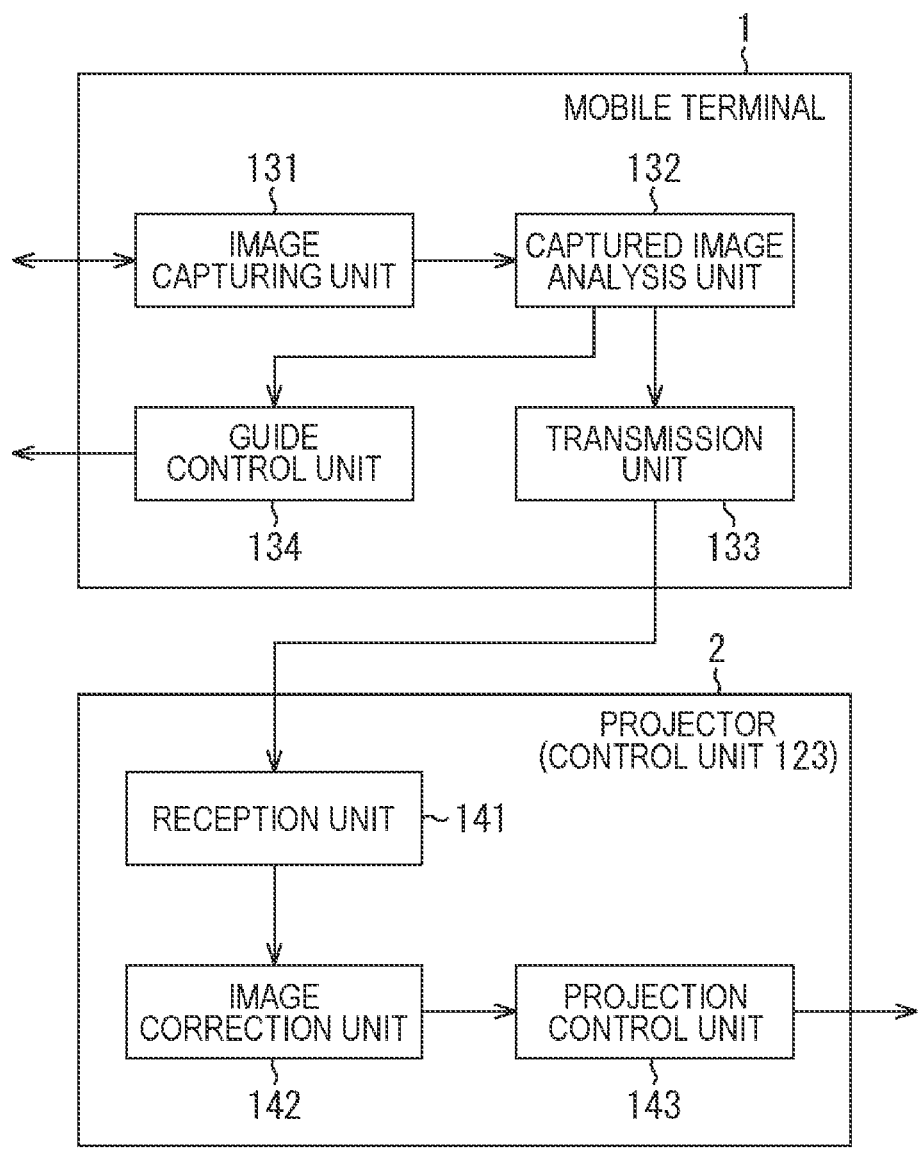
FIG. 7 is a block diagram illustrating a functional configuration example of the information processing system.

FIG. 7 is a block diagram illustrating a functional configuration example of the information processing system.

As illustrated in FIG. 7, in the mobile terminal 1 an image capturing unit 131, a captured image analysis unit 132, a transmission unit 133, and a guide control unit 134 are implemented.

The image capturing unit 131 captures an image of a range including the entire projection image projected on the projection surface 3 by the projector 2 a plurality of times at different positions. The image capturing unit 131 outputs the plurality of captured images obtained by the image capturing to the captured image analysis unit 132.

Each of the captured images obtained by the image capturing unit 131 performing the image capturing may be a still image or a frame included in a moving image. In a case where the moving image is captured, a predetermined number of frames are extracted from all the frames included in the moving image, and the extracted frames are output to the captured image analysis unit 132 as the plurality of captured images having different image capturing positions.

The captured image analysis unit 132 estimates camera parameters (image capturing parameters), which are parameters related to image capturing, on the basis of the captured images output from the image capturing unit 131 and the dot pattern used in the projector 2. The camera parameters include a camera internal parameter and a camera external parameter. Note that information regarding the dot pattern projected from the projector 2 is given to the captured image analysis unit 132.

In addition, the captured image analysis unit 132 estimates projector parameters (projection parameters), which are parameters related to projection of the projector 2, on the basis of the captured images and the dot pattern. The projector parameters include a projector internal parameter and a projector external parameter.

The captured image analysis unit 132 generates the correction data used for geometric correction of the input image on the basis of the camera parameters and the projector parameters, and outputs the correction data to the transmission unit 133. The camera parameters estimated by the captured image analysis unit 132 are appropriately output to the guide control unit 134.

The transmission unit 133 controls the communication unit 111 in FIG. 5 to transmit the correction data output from the captured image analysis unit 132 to the projector 2.

The guide control unit 134 causes the display 106 or the speaker 108 to output information serving as the guide for the image capturing posit ions on the basis of the camera parameters output from the captured image analysis unit 132.

As illustrated in FIG. 7, in the control unit 123 of the projector 2, a reception unit 141, an image correction unit 142, and a projection control unit 143 are implemented.

The reception unit 141 controls the communication unit 122 in FIG. 6 to receive the correction data transmitted from the mobile terminal 1 and output the correction data to the image correction unit 142.

The image correction unit 142 performs geometric correction on an image of content or the like as the input image by using the correction data output from the reception unit 141. As described above, the geometric correction by the image correction unit 142 is processing performed after the correction data is generated in the mobile terminal 1 on the basis of the captured images obtained by the mobile terminal 1 capturing images of the dot pattern projected by the projector 2 itself. The image correction unit 142 outputs the corrected image, which is the input image after the geometric correction, to the projection control unit 143.

The projection control unit 143 outputs the corrected image output from the image correction unit 142 to the projection unit 121 and causes the projection unit 121 to project the corrected image. Furthermore, at the time of generating the correction data, the projection control unit 143 causes the projection unit 121 to project an image such as the known dot pattern.

Figure 8:
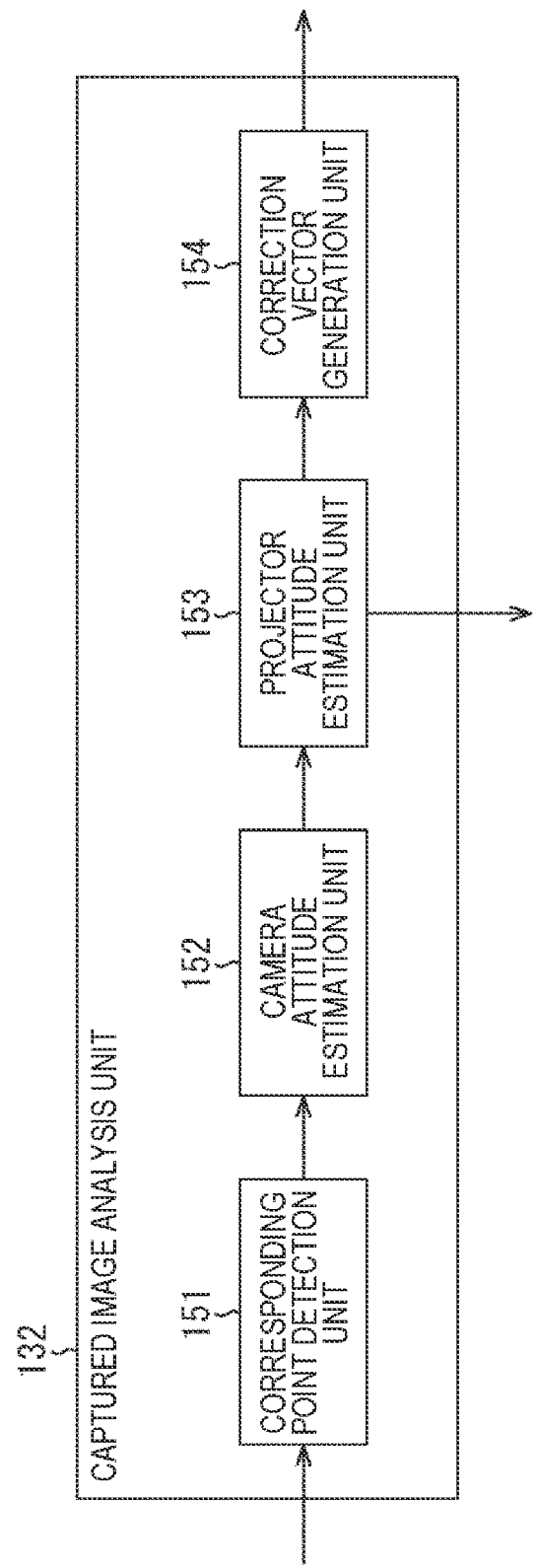
FIG. 8 is a block diagram illustrating a configuration example of a captured image analysis unit of the mobile terminal.

FIG. 8 is a block diagram illustrating a functional configuration example of the captured image analysis unit 132 of the mobile terminal 1.

The captured image analysis unit 132 includes a corresponding point detection unit 151, a camera attitude estimation unit 152, a projector attitude estimation unit 153, and a correction vector generation unit 154. The plurality of captured images output from the image capturing unit 131 is input to the corresponding point detection unit 151. Each of the captured images output from the image capturing unit 131 shows the dot pattern projected on the projection surface 3.

The corresponding point detection unit 151 performs corresponding point detection processing, which is processing of detecting corresponding points on each of the plurality of captured images on the basis of the plurality of captured images and the dot pattern. The corresponding point detection processing is performed such that each of the captured images is focused on one by one and dots shown in each of the captured images and corresponding dots included in the dot pattern are detected.

The corresponding point detection unit 151 stores corresponding point information, which is information indicating the relationship between the corresponding points detected by the corresponding point detection processing, and outputs the corresponding point information to the camera attitude estimation unit 152.

The camera attitude estimation unit 152 estimates the camera internal parameter of the camera (the camera 109 of the mobile terminal 1) used to capture each of the captured images on the basis of the corresponding point information of each of the captured mages output from the corresponding point detection unit 151. The camera internal parameter includes, for example, a focal length and a principal point.

Furthermore, the camera attitude estimation unit 152 estimates the camera external parameter on the basis of the corresponding point information of each of the captured images. The camera external parameter includes the position and attitude of the camera when each of the captured images is captured.

Hereinafter, corresponding points on the dot pattern used in the projector 2 are appropriately referred to as projector corresponding points. Corresponding points on the captured images are camera corresponding points.

The camera attitude estimation unit 152 outputs the corresponding point information of each of the captured images and the estimated camera parameters to the projector attitude estimation unit 153.

The projector attitude estimation unit 153 estimates the projector internal parameter of the projector 2 that has projected the projection image on the basis of the corresponding point information of each of the captured images and the camera parameters of each of the captured images output from the camera attitude estimation unit 152. The projector internal parameter includes, for example, a focal length and a principal point.

In addition, the projector attitude estimation unit 153 estimates the projector external parameter on the basis of the corresponding point information of each of the captured images and the camera parameters of each of the captured images. The projector external parameter includes the position and attitude of the projector 2 when the projection image is projected.

The projector attitude estimation unit 153 outputs the corresponding point information of each of the captured images, the camera parameters of each of the captured images, and the estimated projector parameters to the correction vector generation unit 154. Furthermore, the projector attitude estimation unit 153 outputs the camera parameters of each of the captured images to the guide control unit 134 in FIG. 7.

As described above, the camera attitude estimation unit 152 and the projector attitude estimation unit 153 constitute an estimation unit that estimates the camera parameters and the projector parameters on the basis of the corresponding point information of each of the captured images.

The correction vector generation unit 154 generates a correction vector as the correction data on the basis of the corresponding point information of each of the captured images, the camera parameters of each of the captured images, and the projector parameters output from the projector attitude estimation unit 153.

The correction vector is a vector representing a correction amount and a correction direction of each pixel included in an image used as the input image in the projector 2. In the geometric correction by the projector 2, the corrected image is generated by the position of each pixel being shifted on the basis of the correction vector.

The correction vector generation unit 154 outputs the correction vector to the transmission unit 133. The correction vector is transmitted to the projector 2 via the transmission unit 133 and used for the geometric correction of the input image in the projector 2.

Operation of Each Device

Here, an operation of each device having the configuration as described above be described.
Operation of Mobile Terminal 1

First, correction data calculation processing #1 of the mobile terminal 1 will be described with reference to a flowchart of FIG. 9.

Figure 9:
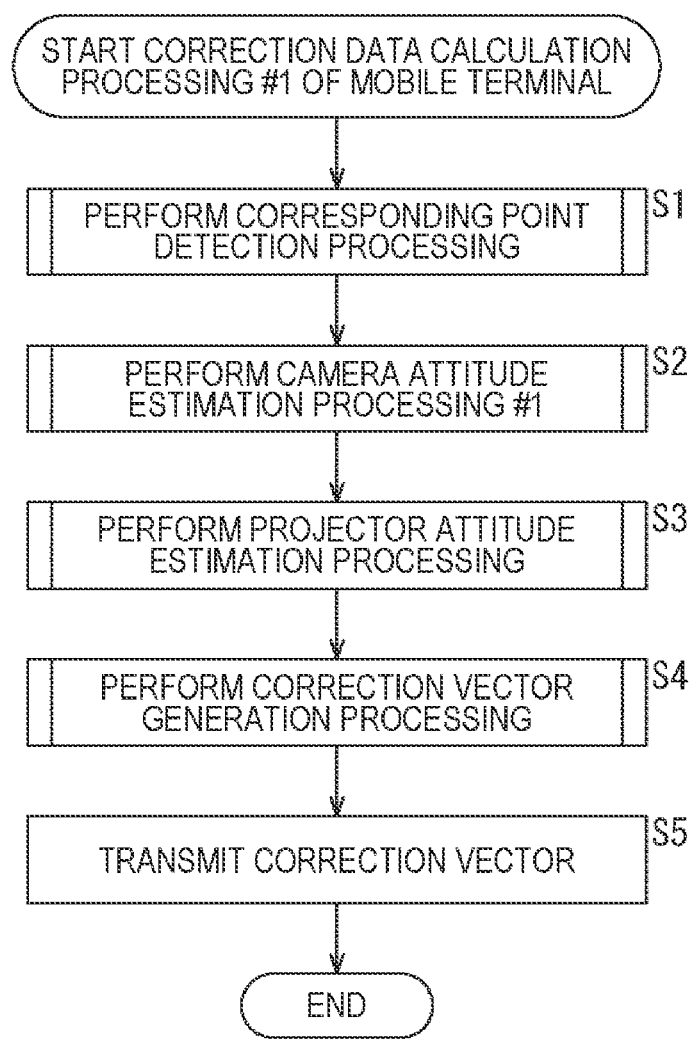
FIG. 9 is a flowchart for describing correction data calculation processing #1 of the mobile terminal.

The correction data calculation processing #1 of FIG. 9 is a series of processing for calculating the correction data used for the geometric correction of the input image. The correction data calculation processing #1 is started, for example, when the projection distortion correction application is activated and the projector 2 projects the dot pattern on the projection surface 3.

In step S1, the corresponding point detection unit 151 performs the corresponding point detection processing. The corresponding point information indicating the relationship between the dot pattern and the corresponding points of each of the captured images is stored by the corresponding point detection processing. The corresponding point detection processing will be described later with reference to a flowchart of FIG. 10.

In step S2, the camera attitude estimation unit 152 performs camera attitude estimation processing #1. The camera attitude estimation processing #1 is performed on the basis of the corresponding point information of each of the captured images obtained by the corresponding point detection processing. The camera parameters of each of the captured images are estimated by the camera attitude estimation processing #1. The camera attitude estimation processing #1 will be described later with reference to a flowchart of FIG. 13.

In step S3, the projector attitude estimation unit 153 performs projector attitude estimation processing. The projector attitude estimation processing is performed on the basis of the corresponding point information of each of the captured images obtained by the corresponding point detection processing and the camera parameters obtained by the camera attitude estimation processing. The projector parameters of the projector 2 are estimated by the projector attitude estimation processing. The projector attitude estimation processing will be described later with reference to a flowchart of FIG. 15.

In step S4, the correction vector generation unit 154 performs correction vector generation processing. The correction vector generation processing is performed on the basis of the corresponding point information of each of the captured images obtained by the corresponding point detection processing, the camera parameters obtained by the camera attitude estimation processing, and the projector parameters obtained by the projector attitude estimation processing. The correction vector used for the geometric correction is generated by the correction vector generation processing. The correction vector generation processing will be described later with reference to a flowchart of FIG. 16.

In step S5, the transmission unit 133 transmits the correction vector generated by the correction vector generation processing to the projector 2.

Next, the corresponding point detection processing performed in step S1 in FIG. 9 will be described with reference to the flowchart of FIG. 10.

In step S11, the image capturing unit 131 controls the camera 109 to capture an image of the range including the entire projection image of the dot pattern.

In step S12, the image capturing unit 131 determines whether or not the number of captured images is equal to or larger than a minimum number of captured images, which is set as a threshold value. Here, it is determined that the number of captured images is equal to or larger than the minimum number of captured images in a case where the number of captured images is, for example, three.

In a case where it is determined in step S12 that the number of captured images is smaller than the minimum number of captured images, the processing returns to step S11, and the image capturing is repeated while the position is changed.

In a case where it is determined in step S12 that the number of captured images is equal to or larger than the minimum number of captured images, the processing proceeds to step S13.

In step S13, the corresponding point detection unit 151 performs pattern detection processing. The pattern detection processing is performed on the basis of the plurality of captured images and the dot pattern. Coordinates of the dots on each captured image are detected by the pattern detection processing, and the relationship between the dots on each of the captured images and the dots on the dot pattern is determined. Details of the pattern detection processing will be described later with reference to a flowchart of FIG. 11.

In step S14, the corresponding point detection unit 151 generates the corresponding point information by associating respective coordinates of the dots on each of the captured images and the dots on the dot pattern, which constitute the corresponding points, and stores the corresponding point information. Thereafter, the processing returns to step S1 in FIG. 9, and the processing in step S1 and subsequent steps is performed.

Next, the pattern detection processing performed in step S13 in FIG. 10 will be described with reference to the flowchart of FIG. 11.

Figure 10:
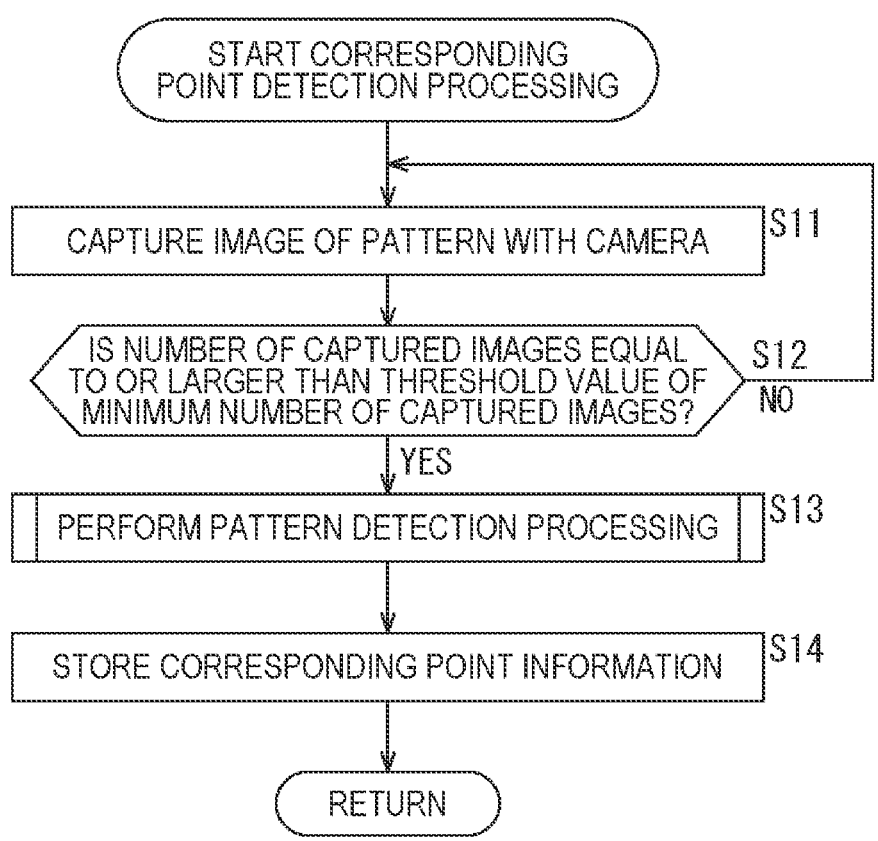
FIG. 10 is a flowchart for describing corresponding point detection processing.
Figure 11:
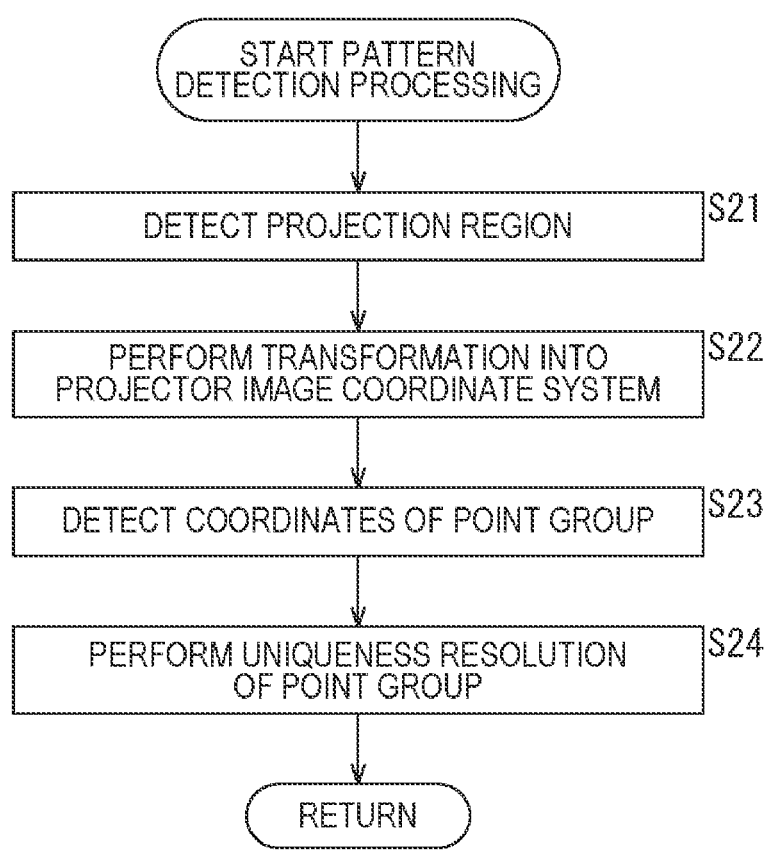
FIG. 11 is a flowchart for describing pattern detection processing.

The pattern detection processing of FIG. 11 is performed on each of the plurality of captured images captured in step S11 in FIG. 10.

In step S21, the corresponding point detection unit 151 analyzes one target captured image, and detects a region in which the projection image of the dot pattern is shown.

In step S22, the corresponding point detection unit 151 performs projective transformation to transform the projection image on the captured image represented in a camera coordinate system into an image in a projector coordinate system. The camera coordinate system is a coordinate system before the projective transformation, and the projector coordinate system is a coordinate system after the projective transformation.

Figure 12:
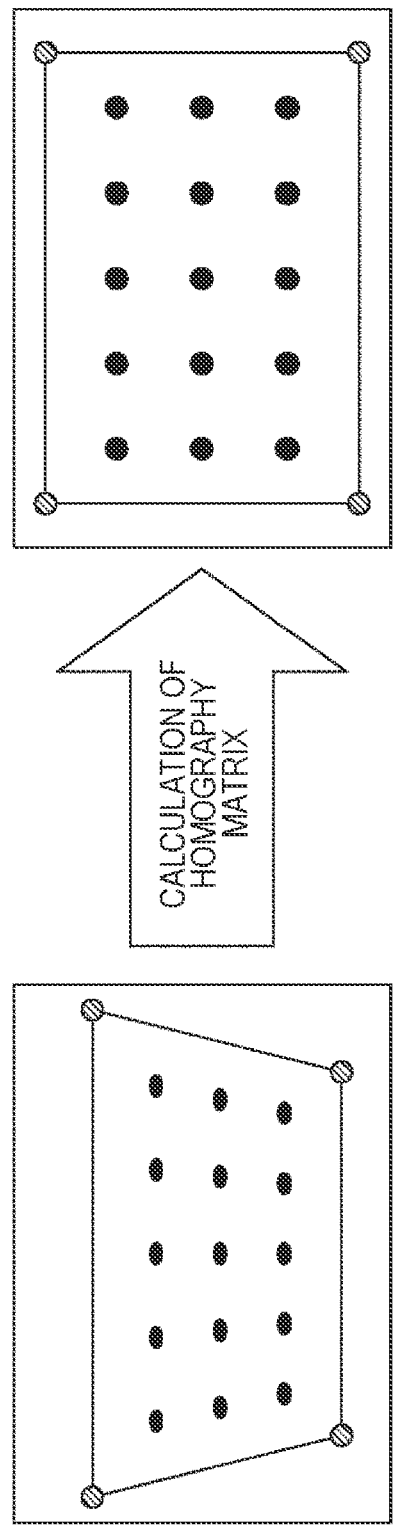
FIG. 12 is a diagram illustrating an example of transformation into a projector coordinate system.

FIG. 12 is a diagram illustrating an example of the transformation into the projector coordinate system.

For example, as illustrated on the left side of FIG. 12, it is assumed that a region in a vertically inverted trapezoidal shape is shown as the projection image in the captured image. In FIG. 12, a small black ellipse that is laterally long represents each dot included in the dot pattern. In addition, a hatched small circle represents a vertex of the region of the projection image.

As illustrated, the projection image of the dot pattern is included on the captured image in a distorted state according to the unevenness of the projection surface 3, the image capturing position, and the like. The fact that each dot included in the dot pattern is represented by a laterally long ellipse indicates that the projection image is distorted.

In this case, the corresponding point detection unit 151 calculates, by a predetermined method, a homography matrix used to transform the coordinate system before the projective transformation into the coordinate system after the projective transformation.

Furthermore, the corresponding point detection unit 151 transforms the projection image shown in the captured image on the basis of the homography matrix so as to obtain a substantially rectangular image having the same shape as that of the input image, as indicated by the point of a white arrow in FIG. 12. In the image after the transformation, each dot included in the dot pattern is represented in a substantially perfect circular shape.

Returning to the description of FIG. 11, in step 323, the corresponding point detection unit 151 detects coordinates of each dot (point group) Cr the captured image.

In step S24, the corresponding point detection unit 151 performs uniqueness resolution and determines the dots on the dot pattern used for the projection, which correspond to the dots on the captured image.

The pattern detection processing as described above is repeated as many times as the number of captured images, and the corresponding point information for each of the captured images is generated. The corresponding point information for each of the captured images indicates the relationship between the camera corresponding points of each of the captured images captured at the corresponding position and the projector corresponding points. Thereafter, the processing returns to step S13 in FIG. 10, and the processing in step S13 and subsequent steps is performed.

Neat, the camera attitude estimation processing #1 performed in step S2 in FIG. 9 will be described with reference to the flowchart of FIG. 13.

In step S31, the camera attitude estimation unit 152 performs camera internal parameter estimation processing #1. The camera internal parameter estimation processing #1 is performed on the basis of the corresponding point information of each of the captured images output from the corresponding point detection unit 151. The camera internal parameter is estimated by the camera internal parameter estimation processing #1.

In step S32, the camera attitude estimation unit 152 estimates the camera external parameter of each of the captured images on the basis of the corresponding point information of each of the captured images and the camera internal parameter.

In step S33, the camera attitude estimation unit 152 optimizes the camera parameters. The camera parameters are optimized, for example, by the camera parameters being adjusted such that, in a case where ray tracking is performed for each of the camera corresponding points of the three captured images, each tracking destination is one point on the projection surface 3. The optimized camera parameters and the corresponding point information of each of the captured images are output to the projector attitude estimation unit 153. Thereafter, the processing returns to step S2 in FIG. 9, and the processing in step S2 and subsequent steps is performed.

The camera internal parameter estimation processing #1 performed in step S31 in FIG. 13 will be described with reference to a flowchart of FIG. 14.

In step S41, the camera attitude estimation unit 152 acquires the corresponding points of the three captured images on the basis of the corresponding point information.

In step S42, the camera attitude estimation unit 152 selects one of the three captured images as a reference image, and selects each of the two captured images other than the reference image as a comparison image. The camera attitude estimation unit 152 calculates a homography matrix representing the relative position and attitude of the camera 109 at the time of capturing each comparison image with reference to the position and attitude of the camera 109 at the time of capturing the reference image.

In step S43, the camera attitude estimation unit 152 estimates the camera internal parameter by solving simultaneous equations defined by the homography matrix. Thereafter, the processing returns to step S31 in FIG. 13 and the processing in step S31 and subsequent steps is performed.

Figure 15:
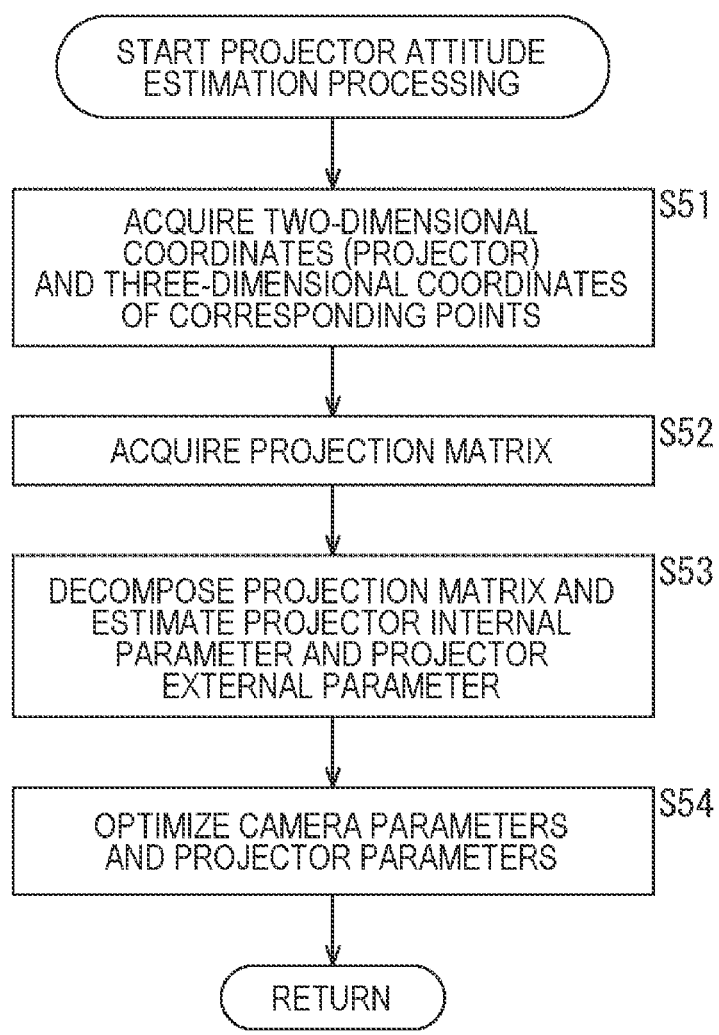
FIG. 15 is a flowchart for describing projector attitude estimation processing.

The projector attitude estimation processing performed in step S3 in FIG. 9 will be described with reference to the flowchart of FIG. 15.

A problem of estimating the position and attitude of a camera or a projector in a case where a plurality of feature points and three-dimensional coordinates thereof are known is known as a Perspective-n-Point (PnP) problem. The projector attitude estimation processing is performed similarly to the PnP problem.

In step S51, the projector attitude estimation unit 153 acquires two-dimensional coordinates of the projector corresponding points on the dot pattern.

In addition, the projector attitude estimation unit 153 performs triangulation on the basis of the camera parameters, and calculates three-dimensional coordinates representing the positions of the camera corresponding points in a three-dimensional space.

In step S52, the projector attitude estimation unit 153 calculates a projection matrix for converting the two-dimensional coordinates of the projector corresponding points into the three-dimensional coordinates of the camera corresponding points.

In step S53, the projector attitude estimation unit 153 decomposes the calculated projection matrix and estimates the projector parameters. The projector parameters are estimated by use of, for example, a six-point algorithm.

In step S54, the projector attitude estimation unit 153 optimizes the camera parameters and the projector parameters. The camera parameters and the projector parameters are optimized, for example, by each of the camera parameters and the projector parameters being adjusted such that, in a case where ray tracking is performed for each of the projector corresponding points and the camera corresponding points, each tracking destination is one point on the projection surface 3. The optimized camera parameters, the optimized projector parameters, and the corresponding point information of each of the captured images are output to the correction vector generation unit 154. Thereafter, the processing returns to step S3 in FIG. 9, and the processing in step S3 and subsequent steps is performed.

The correction vector generation processing performed in step S4 in FIG. 9 will be described with reference to the flowchart of FIG. 16.

In step S61, the correction vector generation unit 154 performs triangulation on the basis of the camera parameters of each of the captured images output from the projector attitude estimation unit 153, and calculates the position of each of the camera corresponding points in the three-dimensional space. That is, the correction vector generation unit 154 estimates each point on the projection surface 3 at the same density as the density of the corresponding points.

Furthermore, the correction vector generation unit 154 estimates, as a screen plane corresponding to the projection surface 3, an approximate plane in which each point on the projection surface 3 calculated three-dimensionally is arranged. For example, the approximate plane of the three-dimensional point Group is estimated by use of a method such as random sample consensus (RANSAC).

In step S62, the correction vector generation unit 154 sets a viewpoint position, which is a position at which the user views the projection image, and an X axis representing a horizontal direction. In order to obtain the correction vector, the viewpoint position and the like are required.

Figure 17:
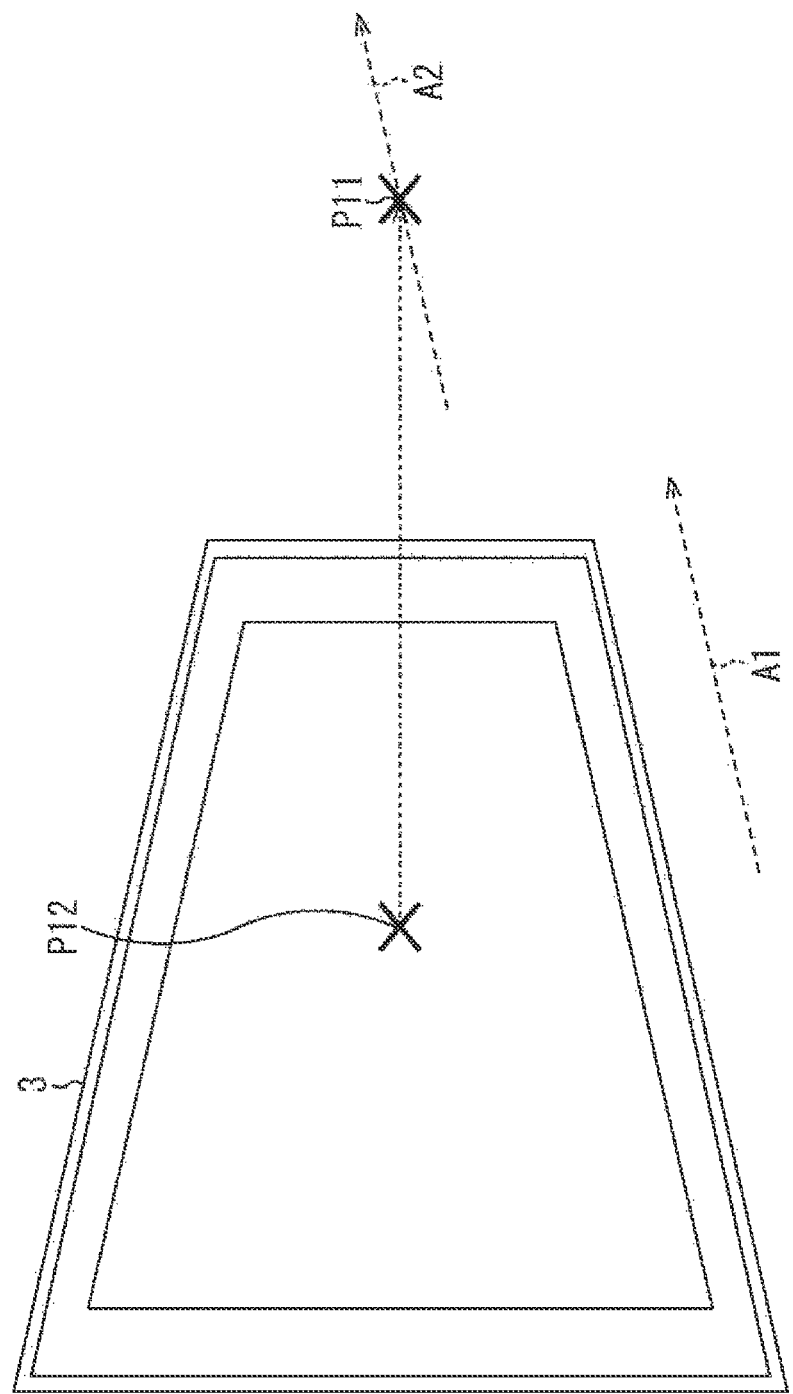
FIG. 17 is a diagram illustrating an example of setting of a viewpoint position and an axis representing a horizontal direction.

FIG. 17 is a diagram illustrating an example of the setting of the viewpoint position and the X axis representing the horizontal direction.

For example, the viewpoint position is set as a position P11 on a perpendicular line passing through a center point P12 of the screen plane. The projection surface 3 in FIG. 17 is a plane represented by the estimation result of the screen plane.

In addition, the X axis representing the horizontal direction is set as an axis passing through the position P11 and parallel to the X axis of the projector 2, as indicated by a broken arrow A2. A broken arrow A1 in FIG. 17 indicates the X axis of the projector 2 (for example, an axis parallel to a bottom surface). The viewpoint position and the horizontal direction may be designated, for example, by the user of the mobile terminal 1 operating the touch panel 107.

Figure 16:
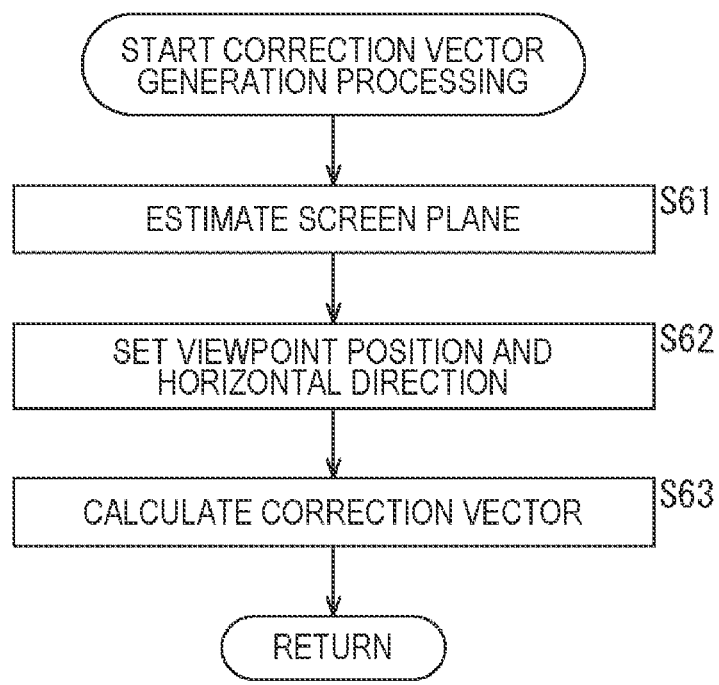
FIG. 16 is a flowchart for describing correction vector generation processing.

Returning to the description of FIG. 16, in step S63, the correction vector generation unit 154 calculates the correction vector on the basis of the screen plane estimated in step S61, the viewpoint position set in step S62, and the like.

Figure 18:
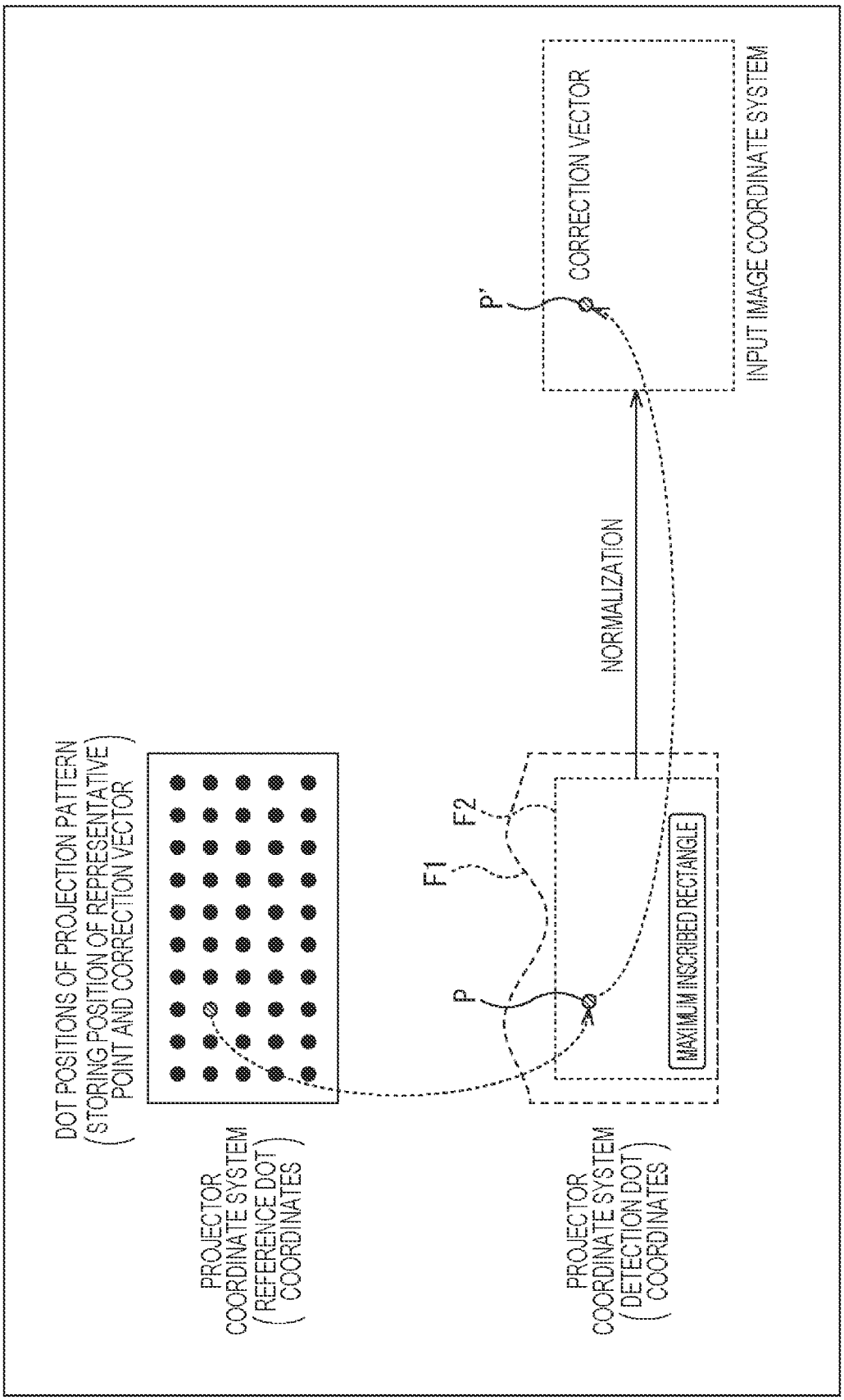
FIG. 18 is a diagram illustrating an example of calculation of a correction vector.

FIG. 18 is a diagram illustrating an example of the calculation of the correction vector.

As illustrated in the upper left part of FIG. 18, coordinates of each dot included in the dot pattern are expressed as coordinates of the projector coordinate system (reference dot coordinates).

Furthermore, the shape of the projection range of the projector 2 on the projection surface 3, which is an uneven surface, is a distorted shape as indicated by a broken line frame F1 at the lower left of FIG. 18. In a case where the projection is performed without the geometric correction, the projection image is projected in the range of the frame F1. As indicated by a broken line frame F2, the correction vector generation unit 154 sets a maximum inscribed rectangle within the projection range, and calculates the correction vector for performing the geometric correction such that each dot is projected within the maximum inscribed rectangle.

Specifically, the correction vector generation unit 154 normalizes a coordinate system of the maximum inscribed rectangle such that coordinates (detection dot coordinates) in the maximum inscribed rectangle corresponds to coordinates in an input image coordinate system.

Furthermore, in the correction vector generation unit 154, for each dot included in the dot pattern, a vector representing a difference between coordinates P' in the input image coordinate system, which are detection dot coordinates to be a projection position of each dot and correspond to coordinates P, and the position of the coordinates P as reference dot coordinates before projection is calculated as the correction vector representing a pixel position is the input image, which is referred to for configuring the corrected image.

The correction vector generation unit 154 calculates and holds the correction vector for each dot. Thereafter, the processing returns to step S4 in FIG. 9, and the processing in step S4 and subsequent steps is performed.

The correction vector generated by the above processing is transmitted to the projector 2.

Operation of Projector 2

Figure 19:
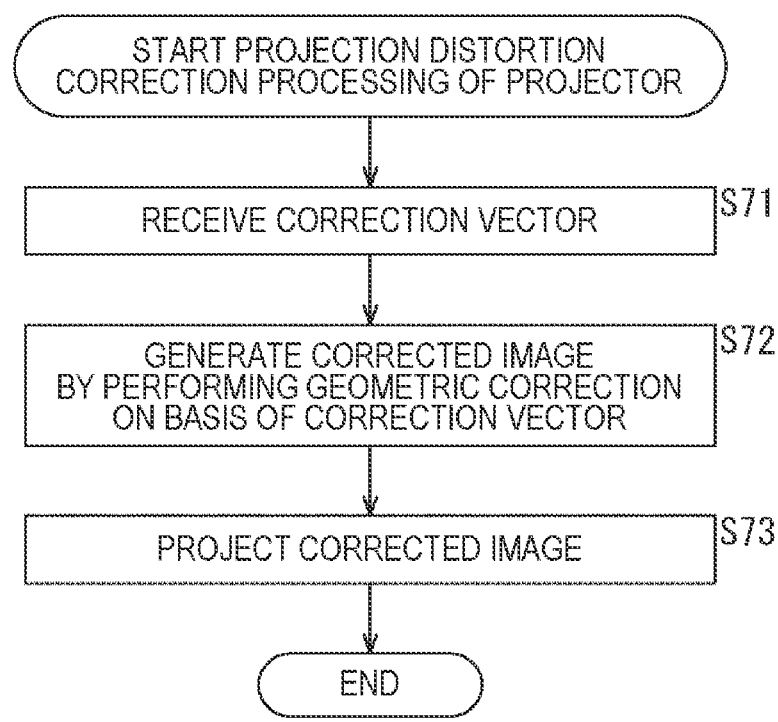
FIG. 19 is a flowchart for describing projection distortion correction processing of the projector.

Next, projection distortion correction processing of the projector 2 will be described with reference to a flowchart of FIG. 19.

In step S71, the reception unit 141 (FIG. 7) of the projector 2 receives the correction vector, which is the correction data transmitted from the mobile terminal 1.

In step S72, the image correction unit 142 generates the corrected image on the basis of the correction vector. The corrected image is generated such that each pixel of the input image obtained, for example, by the content being reproduced is arranged at a predetermined position on the basis of the correction vector.

For example, the image correction unit 142 generates the corrected image by replacing a pixel value at the position of the coordinates P as reference dot coordinates before projection with a pixel value at the position of the coordinates P on the basis of the correction vector. Note that, for a pixel at coordinates between the dots of the dot pattern, a pixel that refers to a pixel value is determined by use of a correction vector obtained by interpolation based on correction vectors corresponding to dots around the pixel.

In step S73, the projection control unit 143 controls the projection unit 121 to cause the projection unit 121 to project the corrected image generated by the image correction unit 142.

By the above processing, it is possible to correct the distortion of the projection image due to the distortion of the projection surface 3.

In addition, in the correction data calculation processing, the camera parameters of the camera 109 used to capture the captured images and the projector parameters of the projector 2 are estimated on the basis of the captured images captured at any positions. Since it is not necessary to know the camera parameters and the projector parameters in calculating the correction data, it is possible to obtain the correction data by use of any image capturing device and projection device.

That is, it is possible to correct the distortion of the projection image without depending on the image capturing position, the image capturing attitude, the position of the projector 2, and the attitude of the projector 2.

Second Embodiment (Example of Estimation by Gradually Increasing Number of Captured Images In this example, an estimation error of the projection surface 3 is obtained on the basis of the estimated camera parameters. In a case where the estimation error of the projection surface 3 is larger than a predetermined threshold value, the number of captured images is increased, and the camera parameters are estimated, for example.

Correction data calculation processing #2 of the mobile terminal 1 will be described with reference to a flowchart of FIG. 20.

In the correction data calculation processing #2, the correction data is generated by use of four or more captured images as appropriate.

In step S81, corresponding point detection processing is performed by use of, for example, three captured images, which are the minimum number of captured images. The corresponding point detection processing is similar to the processing described with reference to FIG. 10.

In step S82, the camera attitude estimation unit 152 performs camera attitude estimation processing #2. In a case where the minimum number of captured images is set to three, the camera attitude estimation processing #2 is basically performed similarly to the camera attitude estimation processing #1 described with reference to FIG. 13.

On the other hand, after processing in step S88 to be described later, that is, in a case where the minimum number of captured images is set to four or more, processing different from the camera attitude estimation processing #1 is performed. The camera attitude estimation processing #2 including camera internal parameter estimation processing #2, which is performed as the processing different from the camera attitude estimation processing #1, will be described later.

Processing in steps S83 to S85 is similar to the processing in steps S3 to S5 in FIG. 9. That is, projector attitude estimation processing is performed in step S83 on the basis of the camera parameters estimated by the camera attitude estimation processing #2. In addition, a correction vector is generated in step S84, and the correction vector is transmitted to the projector 2 in step S85.

In step S86, the correction vector generation unit 154 determines whether or not the estimation error of each point on the projection surface 3 obtained on the basis of the camera parameters is equal to or smaller than a predetermined maximum estimation error set as the threshold value. The estimation error of each point on the projection surface 3 is represented by, for example, a triangulation error based on the camera parameters or the like.

In a case where it is determined in step S86 that the estimation error is equal to or larger than the maximum estimation error, the processing proceeds to step S87.

In step S87, the image capturing unit 131 determines whether or not the number of captured images is equal to or larger than a predetermined maximum number of captured images set as a threshold value.

Figure 20:
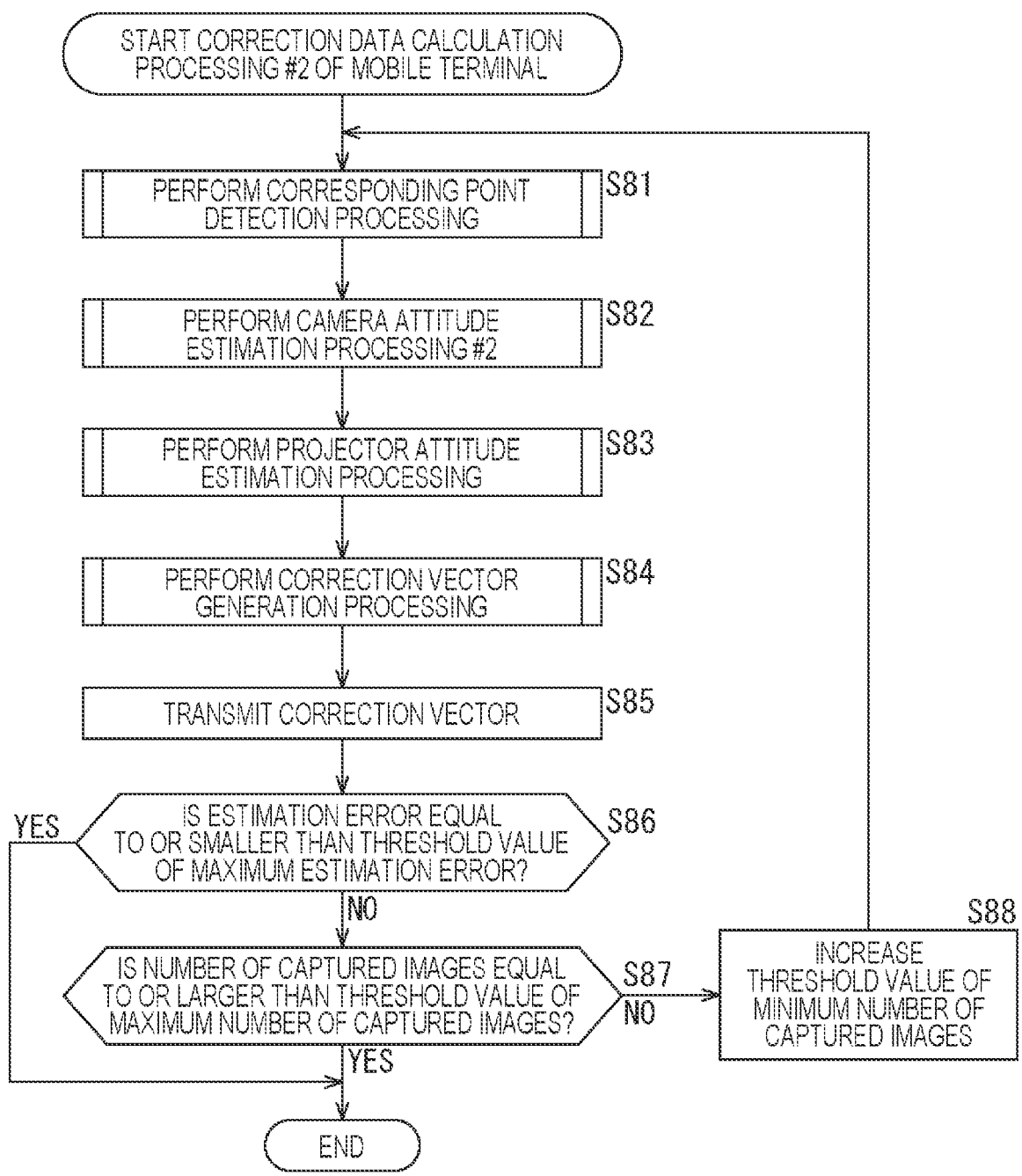
FIG. 20 is a flowchart for describing correction data calculation processing #2 of the mobile terminal.

In a case where it is determined in step S87 that the number of captured images is equal to or larger than the maximum number of captured images, the processing of FIG. 20 ends. Similarly, in a case where it is determined in step S86 that the estimation error is smaller than the maximum estimation error, the processing of FIG. 20 ends.

On the other hand, in a case where it is determined in step S87 that the number of captured images is smaller than the maximum number of captured images, the processing proceeds to step S88.

In step S88, the image capturing unit 131 increases the minimum number of captured images by a predetermined number. Thereafter, the processing returns to step S81, and the processing in step S81 and subsequent steps is performed.

In response to increasing the minimum number of captured images, the image capturing unit 131 changes the image capturing position, for example, and captures an image again. In the subsequent processing, processing similar to the above-described processing is performed in a form in which the newly captured image is added.

Basically, more robust attitude estimation can be performed when there is a variation in the image capturing position. If the number of captured images is added and the attitude estimation is performed, it is possible to improve the accuracy of the parameters.

Instead of performing image capturing again, the image capturing unit 131 may capture four or more captured images in advance, and the attitude estimation or the like may be performed by use of the same number of captured images as the minimum number of captured images. As the minimum number of captured images as the threshold value is increased, the number of captured images used for the attitude estimation or the like gradually increases.

Furthermore, a moving image may be captured instead of a still image, and a captured image used for the attitude estimation or the like may be appropriately selected.

Figure 21:
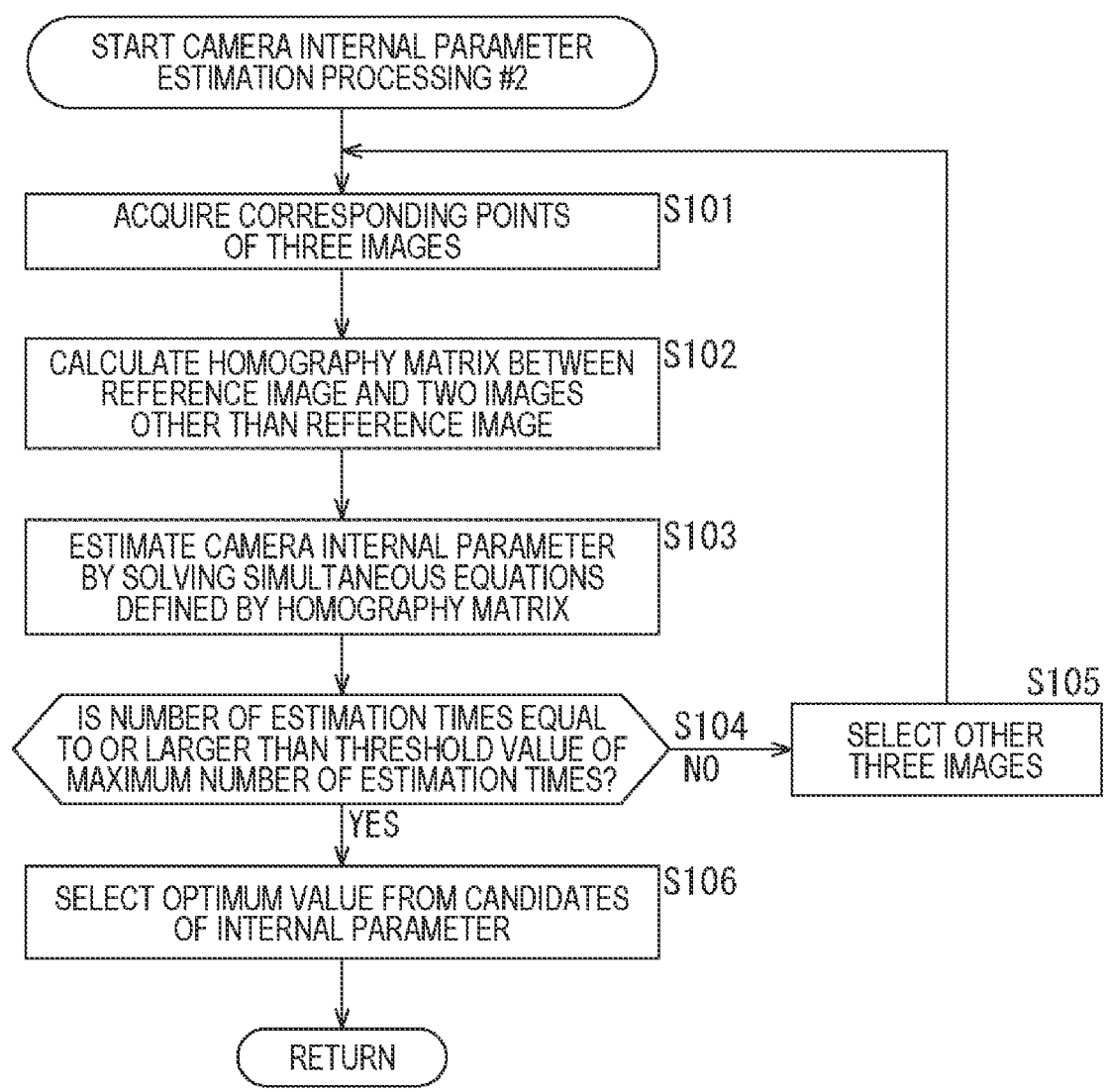
FIG. 21 is a flowchart for describing camera internal parameter estimation processing #2.

The camera internal parameter estimation processing 42 in the camera attitude estimation processing #2 performed in step S82 in FIG. 20 will be described with reference to a flowchart of FIG. 21.

As described with reference to FIG. 13, in the camera attitude estimation processing 41, the processing of estimating the camera internal parameter is performed (step S31). The camera internal parameter estimation processing 42 is processing performed in a case where the minimum number of captured images is increased in step S68 in FIG. 20 and, for example, four or more captured images are acquired.

In step S101, the camera attitude estimation unit 152 randomly selects three captured images and acquires corresponding point information of the selected three captured images.

Figure 14:
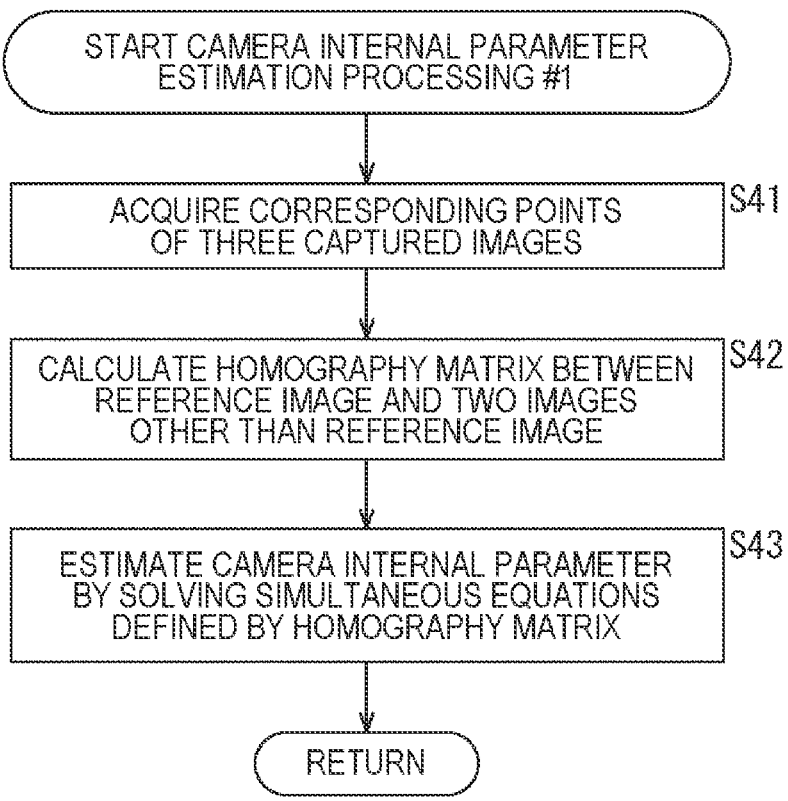
FIG. 14 is a flowchart for describing camera internal parameter estimation processing #1.

Processing in steps S102 and S103 is similar to the processing in steps S42 and S43 in FIG. 14. That is, the camera attitude estimation unit 152 calculates a homography matrix representing the relative position and attitude of the camera 109 at the time of capturing remaining two comparison images with reference to the position and attitude of the camera 109 at the time of capturing one reference image, and estimates the camera internal parameter.

In step S104, the camera attitude estimation unit 152 determines whether or not the number of times of estimating the camera internal parameter is equal to or larger than a predetermined maximum number of estimation times set as a threshold value.

In a case where it is determined in step S104 that the number of times of estimating the camera internal parameter is smaller than the maximum number of estimation times, the processing proceeds to step S105.

In step S105, the camera attitude estimation unit 152 selects three captured images different from the three captured images used so far for the estimation of the camera internal parameter, and performs the processing in and after step S101.

On the other hand, in a case where it is determined in step S104 that the number of times of estimating the camera internal parameter is equal to or larger than the maximum number of estimation times, the processing proceeds to step S106.

In step S106, the camera attitude estimation unit 152 selects a camera internal parameter as an optimum estimation value using a plurality of camera internal parameters as candidates.

For example, the camera attitude estimation unit 152 obtains the estimation error of each point on the projection surface 3 on the basis of the camera internal parameters. The camera attitude estimation unit 152 selects a combination of three captured images having the smallest estimation error on the basis of the obtained estimation error, and selects, as the optimum estimation value, a camera internal parameter estimated from the selected combination of captured images.

Figure 22:
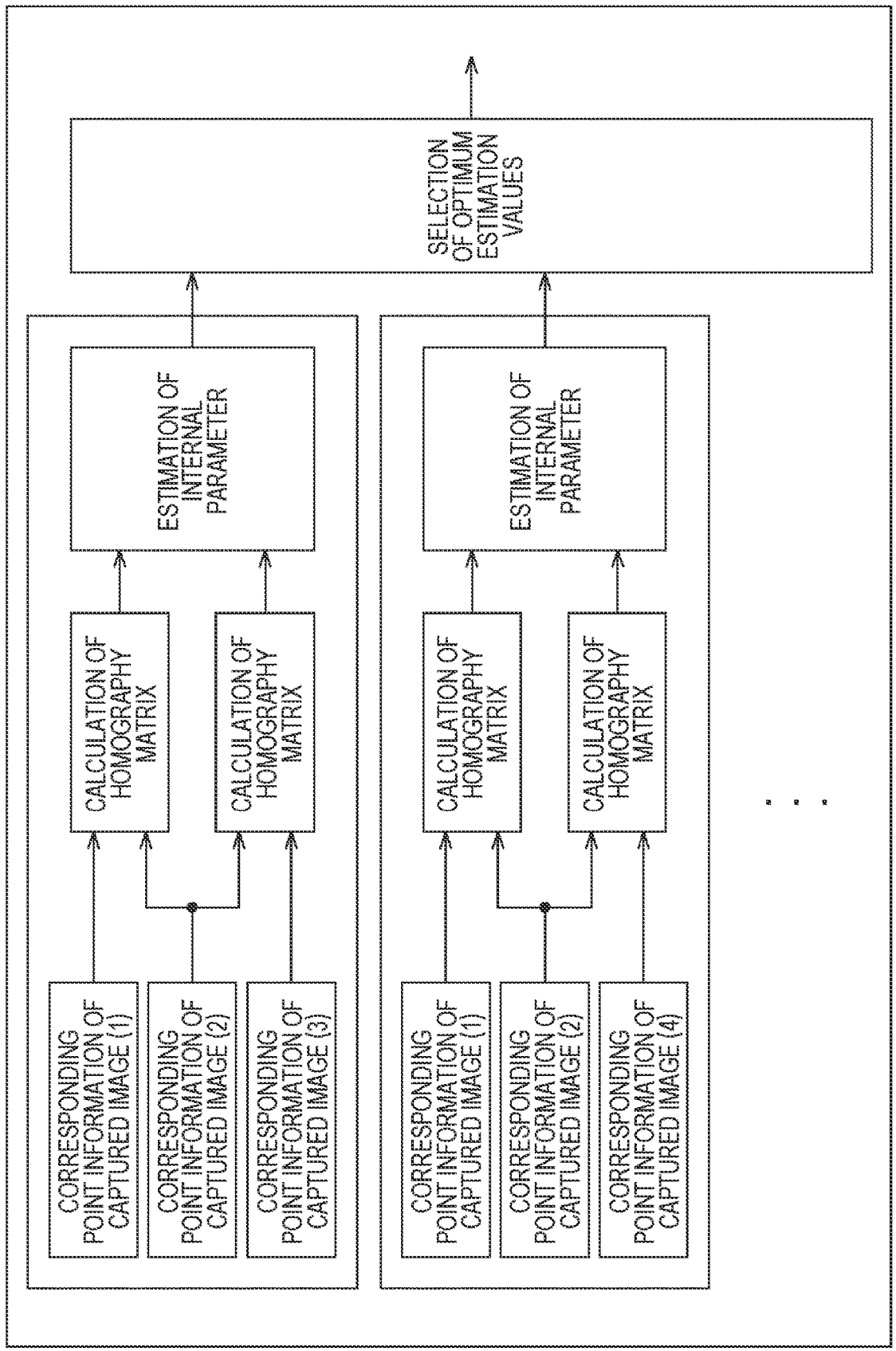
FIG. 22 is a diagram illustrating an example of a method of selecting an optimum estimation value.

FIG. 22 is a diagram illustrating an example of selecting the optimum estimation value.

For example, in a case where four captured images including captured images (1) to (4) are acquired, as illustrated in the upper part of FIG. 22, a camera internal parameter is estimated on the basis of respective corresponding point information of randomly selected captured images (1), (2), and (3).

Furthermore, as illustrated in the lower part of FIG. 22, the combination of the captured images is changed, and a camera internal parameter is estimated on the basis of respective corresponding point information of the captured images (1), (2), and (4).

In this manner, the optimum camera internal parameter is selected from among the plurality of camera internal parameters estimated by the combination of the captured images being sequentially changed.

The camera internal parameter as the optimum estimation value may be selected on the basis of dispersion of image capturing angles.

In this case, the camera attitude estimation unit 152 calculates an image capturing angle, which is an angle of each of the image capturing positions relative to, for example, the center of the projection surface 3, on the basis of each of the image capturing positions of the captured images. The camera attitude estimation unit 152 selects, as the optimum estimation value, a camera internal parameter obtained from a combination of three captured images having the largest dispersion of the image capturing angles.

FIG. 23 is a diagram illustrating an example of the image capturing angles.

As illustrated in A and B of FIG. 23, it is assumed that a camera internal parameter is estimated by use of captured images captured at positions P31, P32, and P33, and a camera internal parameter is estimated by use of captured images captured at positions P31, P32, and P34. The positions P31 to P34 are image capturing positions estimated by the camera attitude estimation unit 152 on the basis of the captured images.

In this case, in particular, since the position P32 and the position P33 are close to each other, the dispersion of mage capturing angles of the positions P31, P32, and P33 is smaller than the dispersion of the image capturing angles of the positions P31, P32, and P34 illustrated in B of FIG. 23.

Therefore, in this case, the camera attitude estimation unit 152 selects, as the optimum estimation value, the camera internal parameter obtained by using the combination of the captured images captured at the positions P31, P32, and P34, which is a combination of the captured images having a large dispersion of the image capturing angles at the respective image capturing positions.

As described above, more robust attitude estimation can be performed when there is a variation in the image capturing position. A camera internal parameter obtained from a combination of three captured images having a large dispersion of the image capturing angles is selected as the optimum estimation value, so that it is possible to select the estimation value with high accuracy.

Third Embodiment (Example of Processing When Projection Distortion Correction is Retried)

In a case where the projection distortion correction is performed once, in the mobile terminal 1, the camera parameters and the projector parameters are estimated and acquired by the estimation processing included in the series of projection distortion correction. In such a state, in a case where the series of projection distortion correction including calculation of the correction data is performed again, an already obtained camera internal parameter may be used as the camera internal parameter.

In a case where an image of the projected dot pattern is captured by use of the same mobile terminal 1, a common value is calculated for the camera internal parameter such as the focal length even if estimation is performed for each of the plurality of projection distortion corrections. That is, the camera internal parameter is a parameter that can be used by diverting a value estimated at the time of the first projection distortion correction to the second and subsequent projection distortion corrections.

Figure 13:
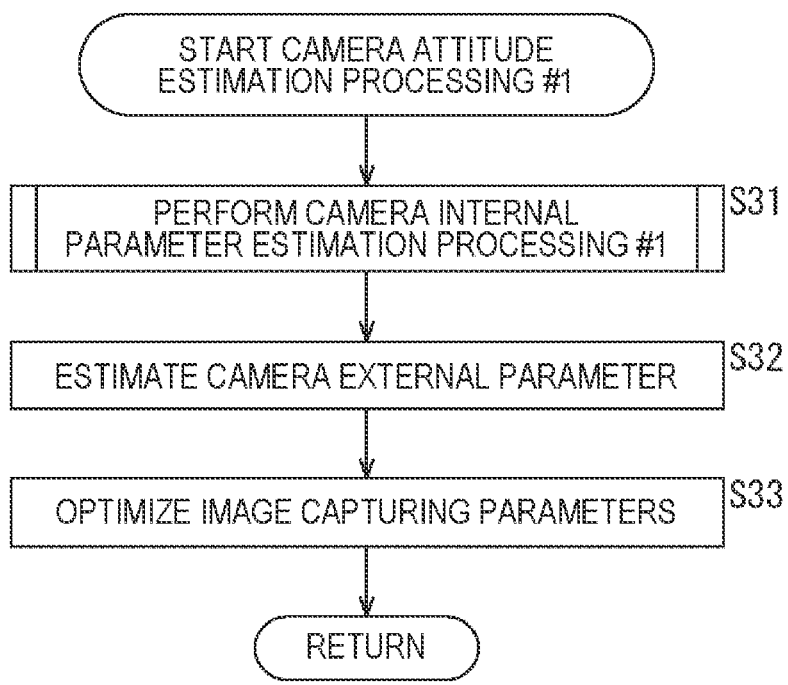
FIG. 13 is a flowchart for describing camera attitude estimation processing #1.

Correction data calculation processing in the case of using the already obtained camera internal parameter also in the second and subsequent projection distortion corrections is basically similar to the correction data calculation processing #1 of FIG. 9 except that camera attitude estimation processing #3 is performed instead of the above-described camera attitude estimation processing #1 (FIG. 13).

Figure 24:
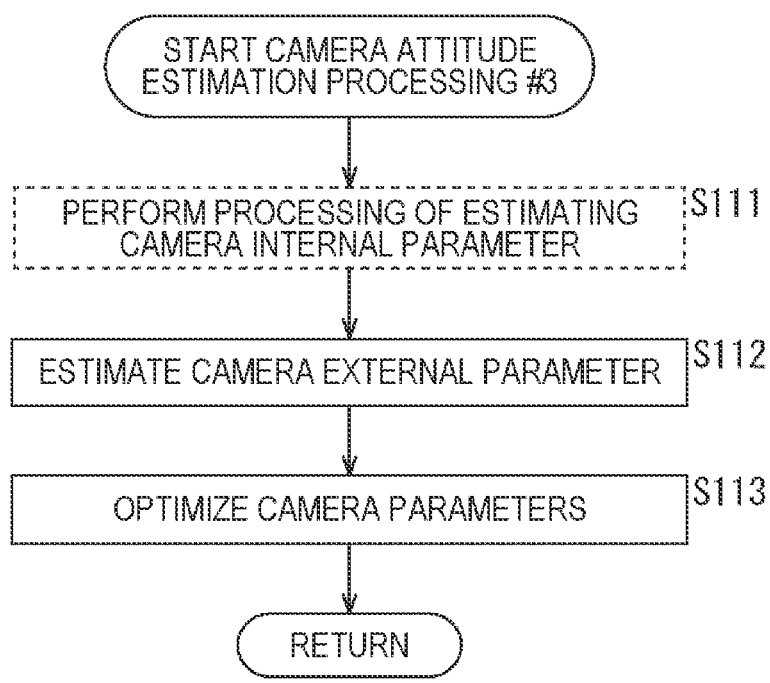
FIG. 24 is a flowchart for describing camera attitude estimation processing #3 of the mobile terminal.

The camera attitude estimation processing #3 of the mobile terminal 1 will be described with reference to a flowchart of FIG. 24.

In the camera attitude estimation processing #3, as indicated by a broken line as processing in step S111, the processing of estimating the camera internal parameter on the basis of the corresponding point information of the captured images is shipped. The camera attitude estimation unit 152 reads the camera internal parameter estimated at the time of the first projection distortion correction and stored in the memory 110 or the like, and performs subsequent processing.

Processing in steps S112 and S113 is similar to the processing in steps S32 and S33 in FIG. 13, respectively.

By the above processing, it is possible to omit the processing of estimating the camera internal parameter on the basis of the corresponding point information of the captured images. As compared with the case where the camera internal parameter is estimated again, a calculation amount can be reduced, and the processing can be sped up.

Fourth Embodiment (Example of Guide for Image Capturing Positions)

As described with reference to FIG. 4, it is possible to present the information serving as the guide for the image capturing positions or the like on the basis of the estimated camera external parameter. In a case where an image of the projected dot pattern is captured again, information for guiding the user to an appropriate image capturing position may be presented.

Figure 25:
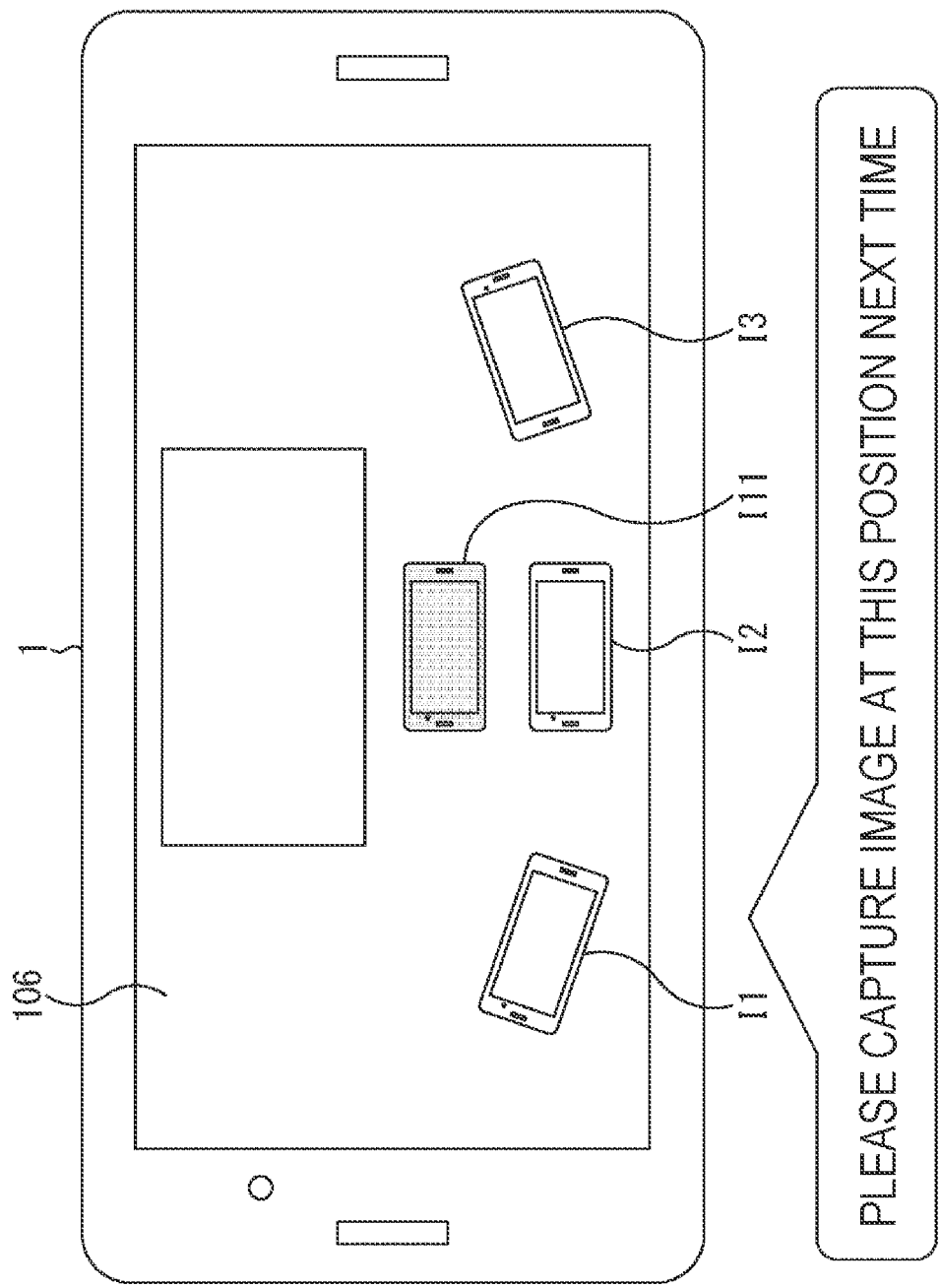
FIG. 25 is a diagram illustrating a presentation example of an appropriate image capturing position.

FIG. 25 is a diagram illustrating a presentation example of the appropriate image capturing position.

In the example of FIG. 25, three image capturing positions at which image capturing has already been performed are indicated by icons I1 to I3 representing the appearance of the mobile terminal 1, and the appropriate image capturing position is displayed by a colored icon I11. The image capturing position presented by the icon I11 as a position in the vicinity of the projection surface 3 is, for example, a position calculated on the basis of the camera parameters or the like.

Furthermore, in the example of FIG. 25, a voice for prompting the user to capture an image at the position displayed on the display 106 is output.

The user who has seen such a guide moves to the position in the vicinity of the projection surface 3 indicated by the icon I11, and captures an image of the dot pattern projected on the projection surface 3.

Correction data calculation processing #3 of the mobile terminal 1, which includes presentation of the appropriate image capturing posit will be described with reference to a flowchart of FIG. 26.

In step S121, the mobile terminal 1 performs processing similar to the correction data calculation processing #1 of FIG. 9.

In step S122, the guide control unit 134 (FIG. 7) calculates the appropriate image capturing position for performing image capturing again on the basis of the camera parameters output from the projector attitude estimation unit 153. For example, a position away from the positions at which image capturing has already been finished by a predetermined distance is calculated as the appropriate image capturing position for performing image capturing again.

In step S123, the guide control unit 134 determines whether or not to perform image capturing again. For example, in a case where the estimation error is larger than the threshold value, it is determined that image capturing is to be performed again.

In a case where it is determined in step S123 that image capturing is to be performed again, in step S124, the guide control unit 134 controls at least one of the display 106 or the speaker 108 to cause at least one of the display 106 or the speaker 108 to output the information for guiding the user to the appropriate image capturing position.

In step S125, the image capturing unit 131 captures an image of the projected dot pattern according to an operation of the user who has moved to the presented image capturing position. Thereafter, the processing returns to step S121, and the processing in step S121 and subsequent steps is performed.

Figure 26:
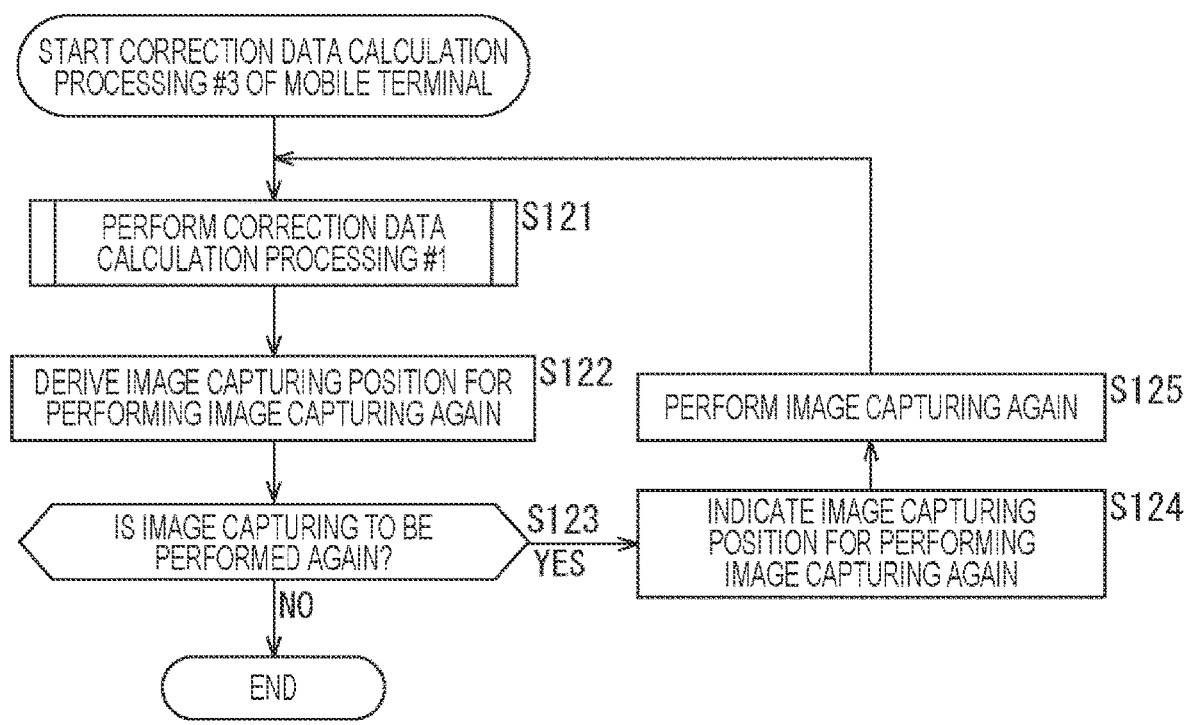
FIG. 26 is a flowchart for describing correction data calculation processing #3 of the mobile terminal.

In a case where i is determined in step S123 that image capturing is not to be performed again, the processing of FIG. 26 ends.

By the above processing, the mobile terminal 1 can present, for example, an image capturing position for suppressing the estimation error to the user. The mobile terminal 1 can estimate camera parameters and projector parameters with higher accuracy than the already obtained camera parameters and projector parameters on the basis of a captured image obtained by performing image capturing again.

Fifth Embodiment (First Example of User Designation of Correction Portion)

After the projection distortion correction is performed once, the user of the mobile terminal 1 may designate a position on the projection surface 3 at which the distortion of the projection image is concerned.

Figure 27:
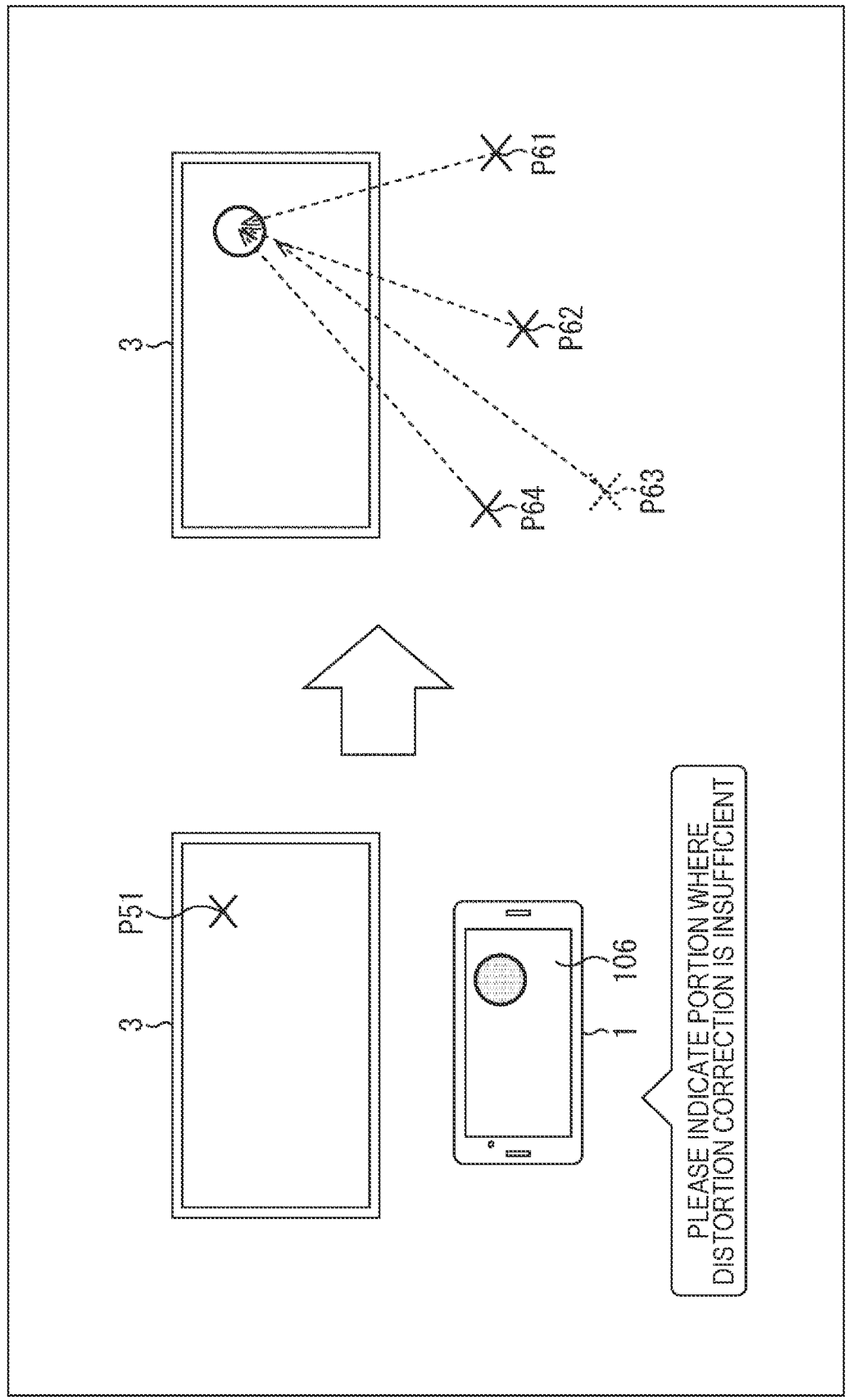
FIG. 27 is a diagram illustrating an example of designation of a position on a projection surface.

FIG. 27 is a diagram illustrating an example of the designation of the position on the projection surface 3.

After the projection distortion correction is performed once, the mobile terminal 1 causes the display 106 to display a screen for designating the position at which the distortion of the projection image is concerned. In addition, the mobile terminal 1 outputs a voice for prompting the user to designate the position at which the distortion of the projection image is concerned.

The user of the mobile terminal 1 can designate the position on the projection surface 3 at which the distortion of the projection image is concerned, for example, by touching a predetermined position on the screen displayed on the display 106 with a finger. A colored circle on the display 106 of the mobile terminal 1 illustrated on the left side of FIG. 27 indicates that the user has designated a position corresponding to a position P51 on the projection surface 3.

In a case where the user designates a predetermined position on the projection surface 3, the mobile terminal 1 determines an image capturing position of a captured image causing an estimation error at the designated position on the projection surface 3. For example, as indicated by the point of an outlined arrow, a case is considered in which the above-described position P51 is designated by the user after the projection distortion correction is performed on the basis of captured images captured at image capturing positions P61 to P63.

The mobile terminal 1 calculates a triangulation error on the basis of the camera parameters estimated by using the captured images captured at the image capturing positions P61 to P63, and determines that the image capturing position of the captured image having the largest influence on the estimation error at the position on the projection surface 3 designated by the user is, for example, the image capturing position P63.

In this case, the mobile terminal 1 presents, to the user, an image capturing position P64, which is a position different from the image capturing positions P61 to P63, as the appropriate image capturing position as described with reference to FIG. 26, and causes the user to perform image capturing again. After the image capturing is performed again, the mobile terminal 1 performs the correction data calculation processing using the three captured images captured at the image capturing positions P61, P62, and P64, which except the captured image captured at the image capturing position P63.

Figure 28:
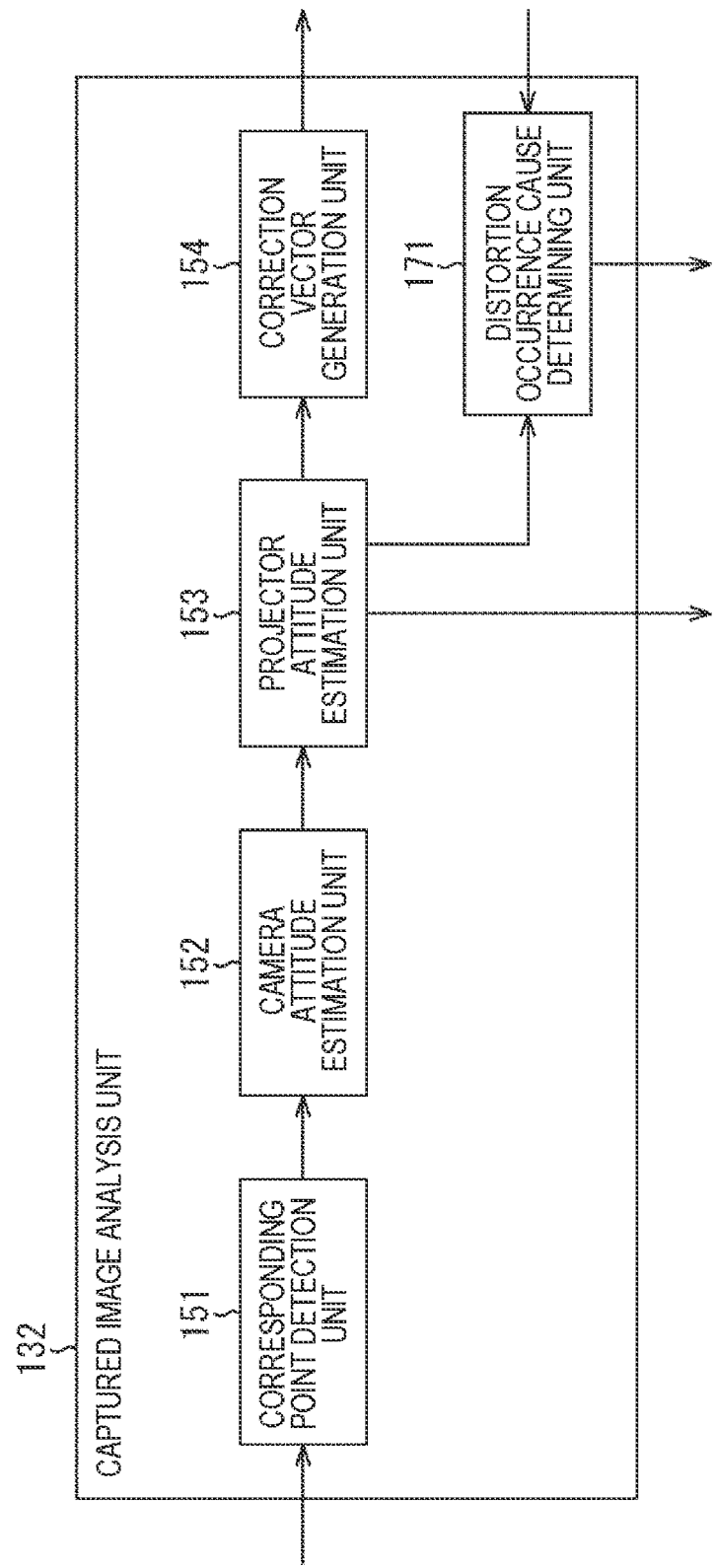
FIG. 28 is a block diagram illustrating a configuration example of the captured image analysis unit of the mobile terminal.

FIG. 28 is a block diagram illustrating a configuration example of the captured image analysis unit 132 of the mobile terminal 1 having a function of switching captured images used for estimation of the camera parameters as described above.

Note that, among components illustrated in FIG. 28, the same components as those illustrated in FIG. 8 are denoted by the same reference numerals. Overlapping description will be omitted as appropriate.

The configuration of the captured image analysis unit 132 illustrated in FIG. 28 includes a distortion occurrence cause determining unit 171 in addition to the corresponding point detection unit 151, the camera attitude estimation unit 152, the projector attitude estimation unit 153, and the correction vector generation unit 154.

The distortion occurrence cause determining unit 171 determines the image capturing position of the captured image having the largest influence on the estimation error at the position on the projection surface 3 designated by the user on the basis of the camera parameters supplied from the projector attitude estimation unit 153.

The image capturing position determined by the distortion occurrence cause determining unit 171 is output to, for example, the guide control unit 134. The guide control unit 134 presents, to the user, a position different from the position determined by the distortion occurrence cause determining unit 171 as the appropriate image capturing position.

Correction data calculation processing #4 of the mobile terminal 1 will be described with reference to a flowchart of FIG. 29.

In step S131, the mobile terminal 1 performs processing similar to the correction data calculation processing #1 of FIG. 9.

In step S132, the distortion occurrence cause determining unit 171 acquires the position on the projection surface 3 designated by the user as a distortion occurrence portion on the basis of a signal supplied from the touch panel 107.

In step S133, the distortion occurrence cause determining unit 171 determines, on the basis of the camera parameters output from the projector attitude estimation unit 153, the image capturing position of the captured image having the largest estimation error at the position on the projection surface 3 designated by the user.

In step S134, the guide control unit 134 determines whether or not to perform image capturing again.

In a case where it is determined in step S134 that image capturing is to be performed again, the processing proceeds to step S135.

In step S135, the guide control unit 134 controls at least one of the display 106 or the speaker 108 to cause at least one of the display 106 or the speaker 108 to output information for guiding the user to the position at which image capturing is performed again.

In step S136, the image capturing unit 131 captures an image of the projected dot pattern according to an operation of the user who has moved to the presented image capturing position. Thereafter, the processing returns to step S131, and the processing in step S131 and subsequent steps is performed.

Figure 29:
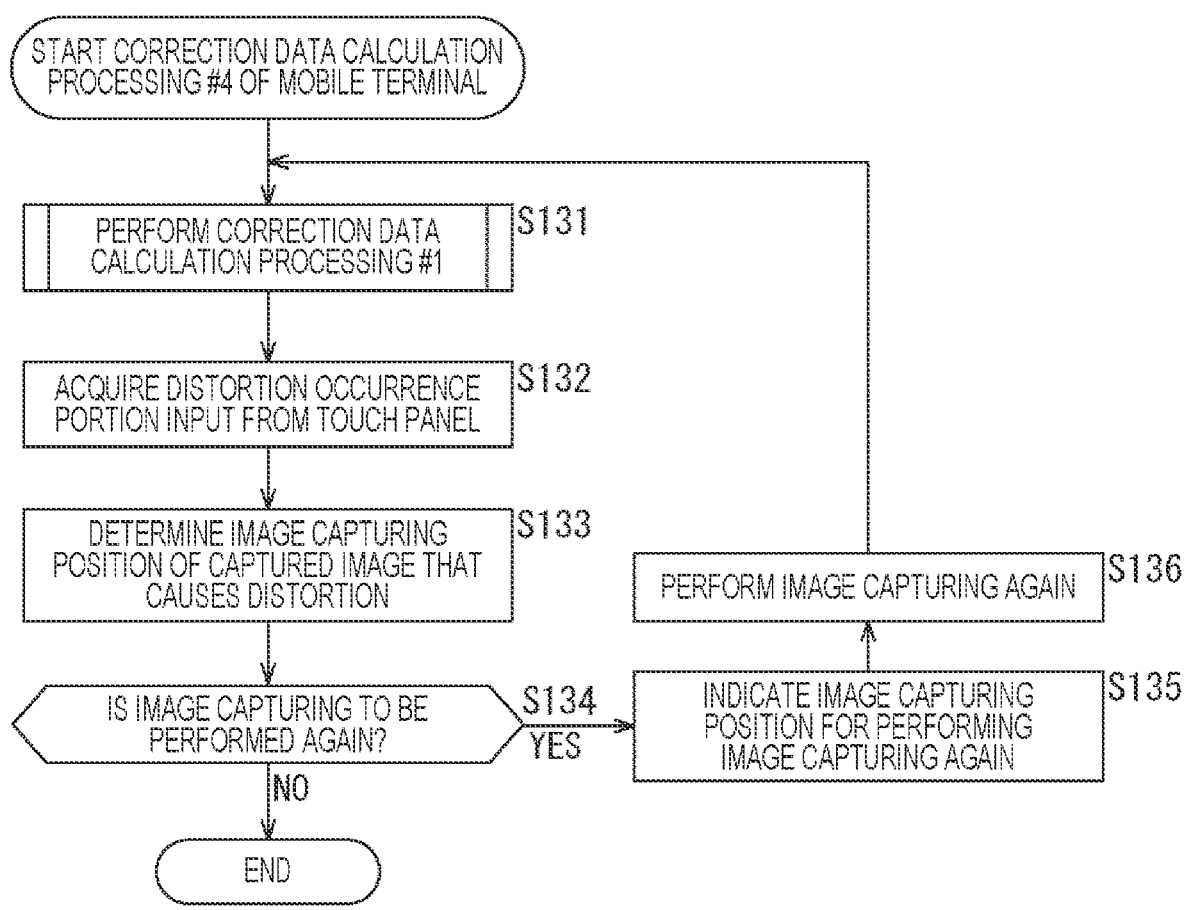
FIG. 29 is a flowchart for describing correction data calculation processing #4 of the mobile terminal.

On the other hand, in a case where it is determined in step S134 that image capturing is not to the performed again, the processing of FIG. 29 ends.

By the above processing, the mobile terminal 1 can generate the correction data for reducing the distortion of the projection image. Furthermore, the user can designate the position at which the distortion is concerned by viewing the actually projected image.

Sixth Embodiment (Second Example of User Designation of Correction Portion)

The user may designate the position at which the distortion of the projection image is concerned as described above, and the projector 2 may project again a fine pattern having a higher density than the pattern projected at the time of the first projection distortion correction in a predetermined range including the designated position.

Figure 30:
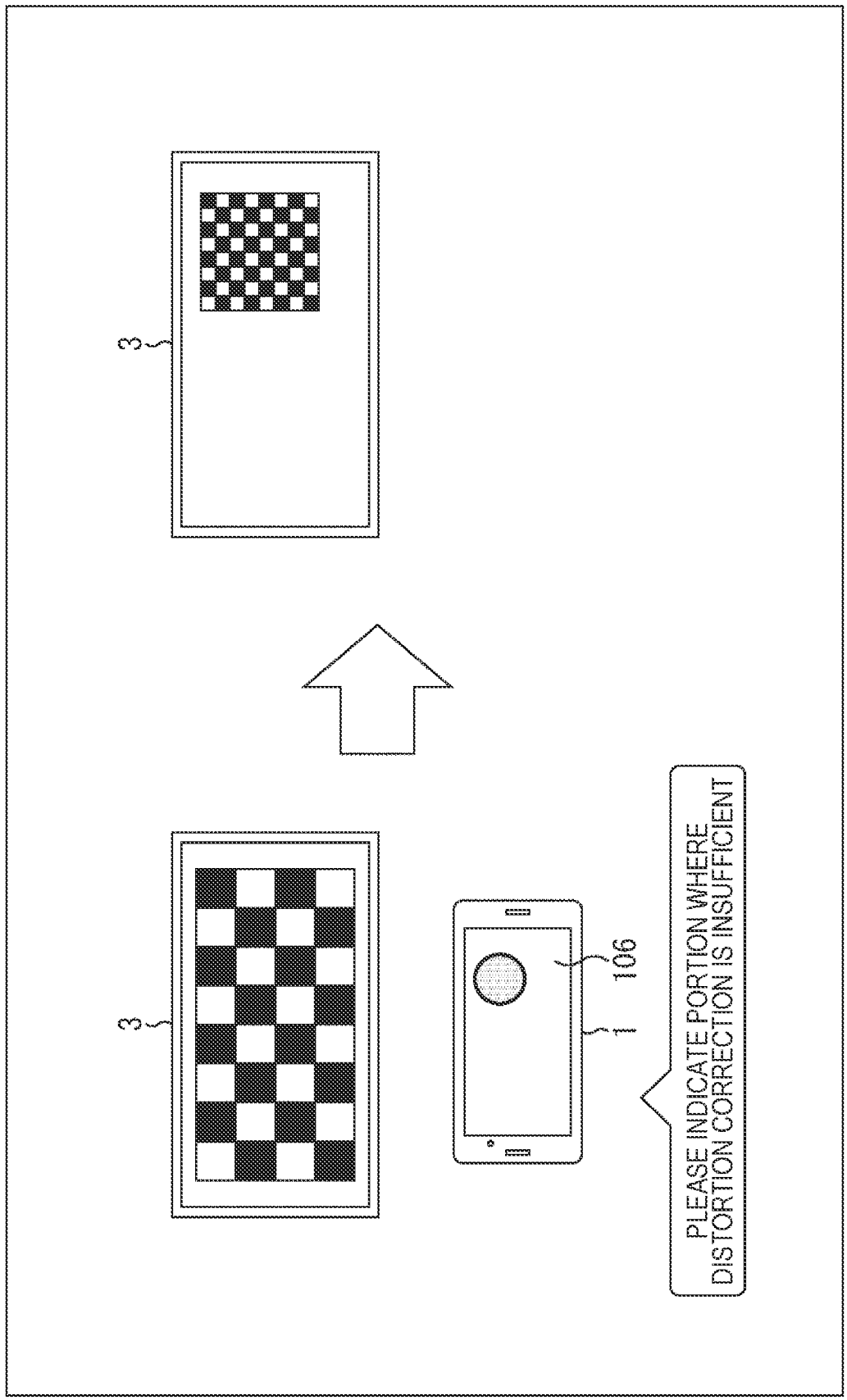
FIG. 30 is a diagram illustrating an example of designation of a position on the projection surface and re-projection.

FIG. 30 is a diagram illustrating an example of the designation of the position on the projection surface 3 and the re-projection.

In the example of FIG. 30, a checker pattern is used as a known pattern image instead of the above-described dot pattern. The checker pattern is a pattern formed by arranging substantially square black regions and substantially square white regions in a checkered pattern. Instead of detecting the dots of the dot pattern as the corresponding points, the positions of corner points of each checker are detected as the corresponding points.

As described above, it is possible to use various patterns in which corresponding points with sufficient accuracy for attitude estimation can be acquired. For example, a tiling pattern of equilateral triangles or ChAruCo markers may be used.

The mobile terminal 1 causes the display 106 to display a screen for designating the position at which the distortion of the projection image is concerned. In addition, the mobile terminal 1 outputs a voice for prompting the user to designate the position at which the distortion of the projection image is concerned.

The user of the mobile terminal 1 can designate the position on the projection surface 3 at which the distortion of the projection image is concerned, for example, by touching a predetermined position on the screen displayed on the display 106 with a finger. A colored circle on the display 106 of the mobile terminal 1 illustrated on the left side of FIG. 30 indicates that the user has designated a position on the projection surface 3 corresponding to the colored circle.

In a case where the user designates a predetermined position on the projection surface 3, the mobile terminal 1 transmits information indicating that the fine pattern is to be projected to the projector 2. The information transmitted by the mobile terminal 1 includes information indicating the position on the projection surface 3 designated by the user and the like.

The projector 2 projects the fine pattern on the basis of the information transmitted from the mobile terminal 1. In the predetermined range on the projection surface 3 including the position designated by the user, the fine pattern as a checker pattern having a higher density than the already projected checker pattern is projected as indicated by the point of an outlined arrow.

Corresponding point detection, parameter estimation, and the like are performed as described above on the basis of a captured image obtained by the mobile terminal 1 capturing an image of the projected fine pattern. As a result, the mobile terminal 1 can generate correction data capable of performing correction with higher accuracy in the vicinity of the position designated by the user.

Figure 31:
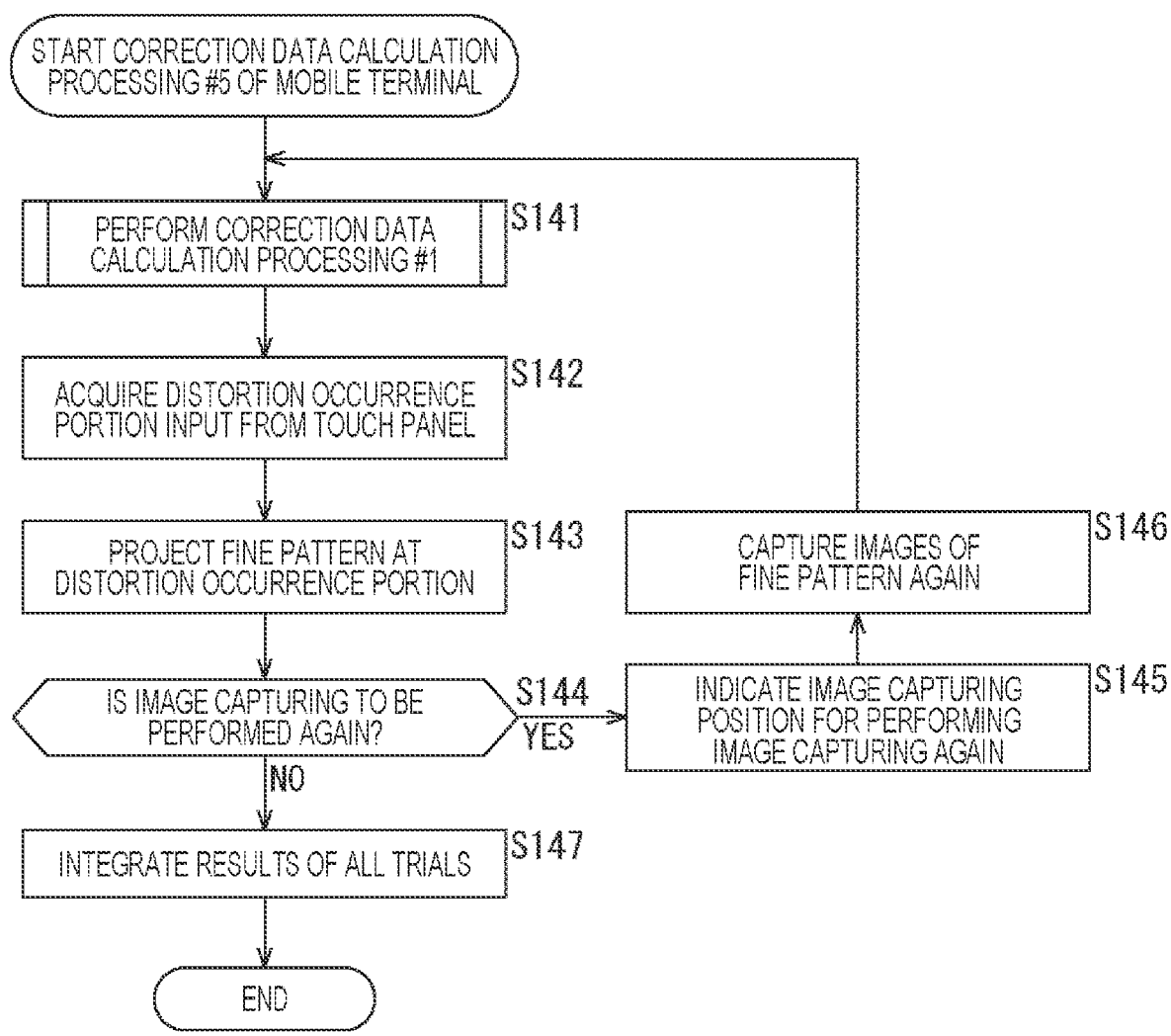
FIG. 31 is a flowchart for describing correction data calculation processing #5 of the mobile terminal.

Correction data calculation processing #5 of the mobile terminal 1 will be described with reference to a flowchart of FIG. 31.

In step S141, the mobile terminal 1 performs processing similar to the correction data calculation processing #1 of FIG. 9.

In step S142, the guide control unit 134 of the mobile terminal 1 acquires the position on the projection surface 3 designated by the user as the distortion occurrence portion on the basis of a signal supplied from the touch panel 107. Information indicating the position acquired by the guide control unit 134 is supplied to the transmission unit 133 via a route not illustrated.

In step S143, the transmission unit 133 transmits, to the projector 2, the information indicating that the fine pattern is to be projected in the predetermined range on the projection surface 3 including the position designated by the user. The projector 2 projects the fine pattern in accordance with an instruction from the mobile terminal 1.

In step S144, the guide control unit 134 determines whether or not to perform image capturing again.

In a case where it is determined in step S144 that image capturing is to be performed again, the processing proceeds to step S145.

In step S145, the guide control unit 134 controls at least one of the display 106 or the speaker 108 to cause at least one of the display 106 or the speaker 108 to output information for guiding the user to the position at which image capturing is performed again.

For example, the guide control unit 134 presents, as the image capturing position for performing image capturing again, a position closer to the projection surface 3 than image capturing positions of captured images used in the first projection distortion correction.

In step S146, the image capturing unit 131 captures an image of the projected fine pattern a plurality of times, for example, at different image capturing positions. Thereafter, the processing returns to step S141, and the processing in step S141 and subsequent steps is performed.

On the other hand, in a case where it is determined in step S144 that image capturing is not to be performed again, the processing proceeds to step S147.

In step S147, the correction vector generation unit 154 integrates the correction data generated as results of all trials. For example, the correction vector generation unit 154 generates a correction vector for performing correction with high density on a range of the input image, which is projected in the predetermined range on the projection surface 3 including the position designated by the user. On the other hand, the correction vector generation unit 154 generates a correction vector for performing correction with low density on a range of the input image, which is projected in a range other than the predetermined range including the position designated by the user.

The correction data generated in this manner is transmitted to the projector 2 and used for geometric correction of the input image.

By the above processing, it is possible to generate correction data that partially reduces the distortion of the projection image.

Seventh Embodiment (Example of Estimation by Image Capturing of Divided Pattern Images)

In a case where the projection surface 3 is wide and the angle of view of the camera 109 is narrow, the entire projection surface 3 may be divided into a predetermined number of regions, and the correction data as described above may be calculated for each of the regions. In order to obtain the correction data for the entire projection surface 3, the above-described correction data calculation processing is performed a plurality of times. For example, a high-density pattern is projected for each of the divided regions.

Figure 32:
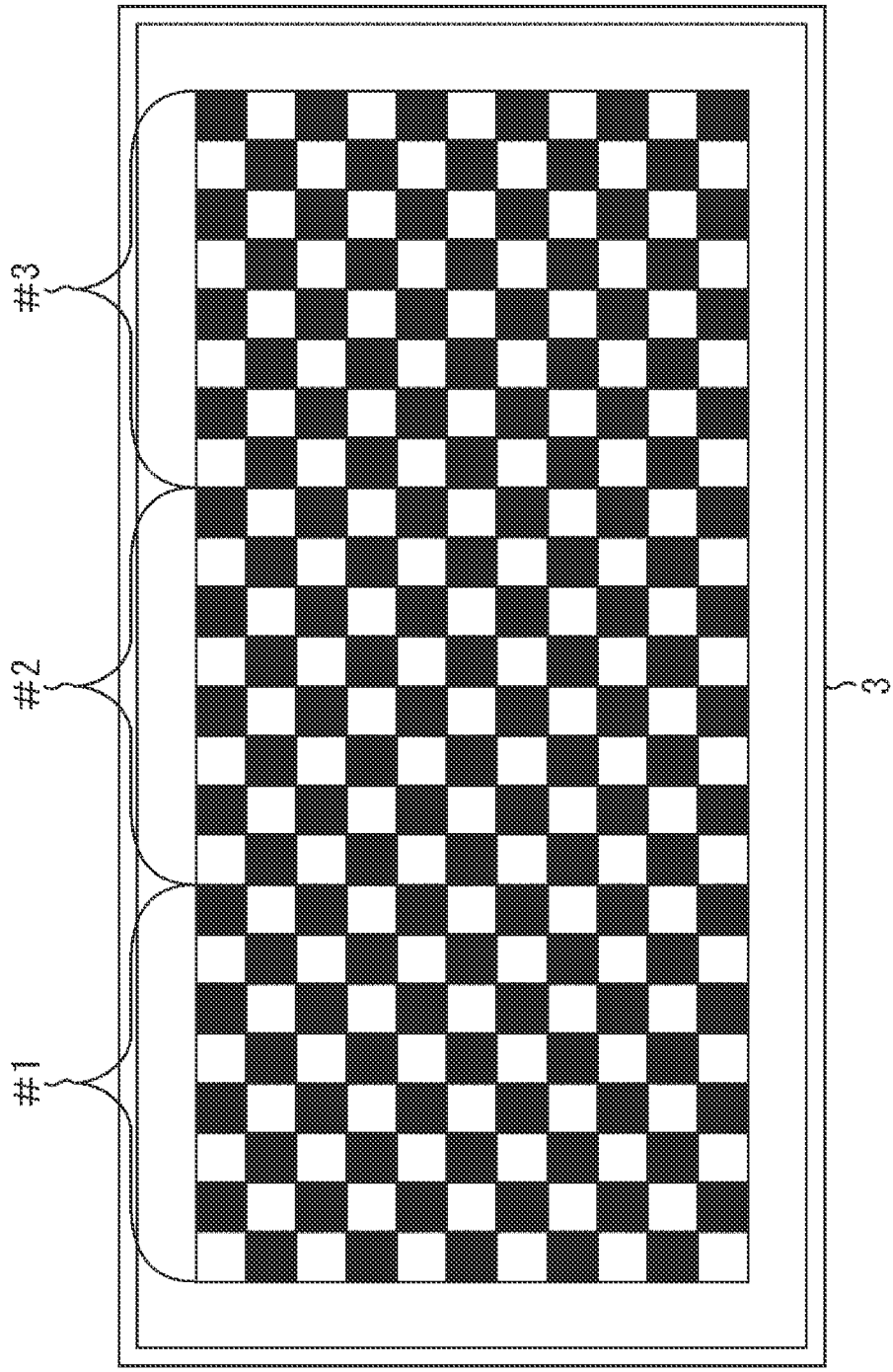
FIG. 32 is a diagram illustrating an example of region division.

FIG. 32 is a diagram illustrating an example of the region division.

In the example of FIG. 32, the entire projection surface 3 is divided into three regions of projection regions #1 to #3. For example, a predetermined pattern is projected for each of the regions as illustrated in FIG. 32.

In a case where the projection surface 3 is divided in such a manner, for example, the mobile terminal 1 captures an image of the pattern projected in the projection region #1 a plurality of times at different image capturing positions. The mobile terminal 1 performs the correction data calculation processing #1 using the captured images, and generates a correction vector for a range of the input image, which is projected in the projection region #1.

Furthermore, the mobile terminal 1 captures an image of the pattern projected in the projection region #2 a plurality of times at different image capturing positions. The mobile terminal 1 performs the correction data calculation processing #1 using the captured images, and generates a correction vector for a range of the input image, which is projected in the projection region #2.

Furthermore, the mobile terminal 1 captures an image of the pattern projected in the projection region #3 a plurality of times at different image capturing positions. The mobile terminal 1 performs the correction data calculation processing #1 using the captured images, and generates a correction vector for a range of the input image, which is projected in the projection region #3.

In the example of FIG. 32, the entire projection surface 3 is divided into three projection regions, but may be divided into any number of regions.

Note that the projection of the pattern on the projection regions #1 to #3 is performed by one projector 2. The position and at of the projector 2 estimated by the correction data calculation processing #1 for each of the projection regions #1 to #3 are common.

Correction data calculation processing #6 of the mobile terminal 1 will be described with reference to a flowchart of FIG. 33.

Figure 33:
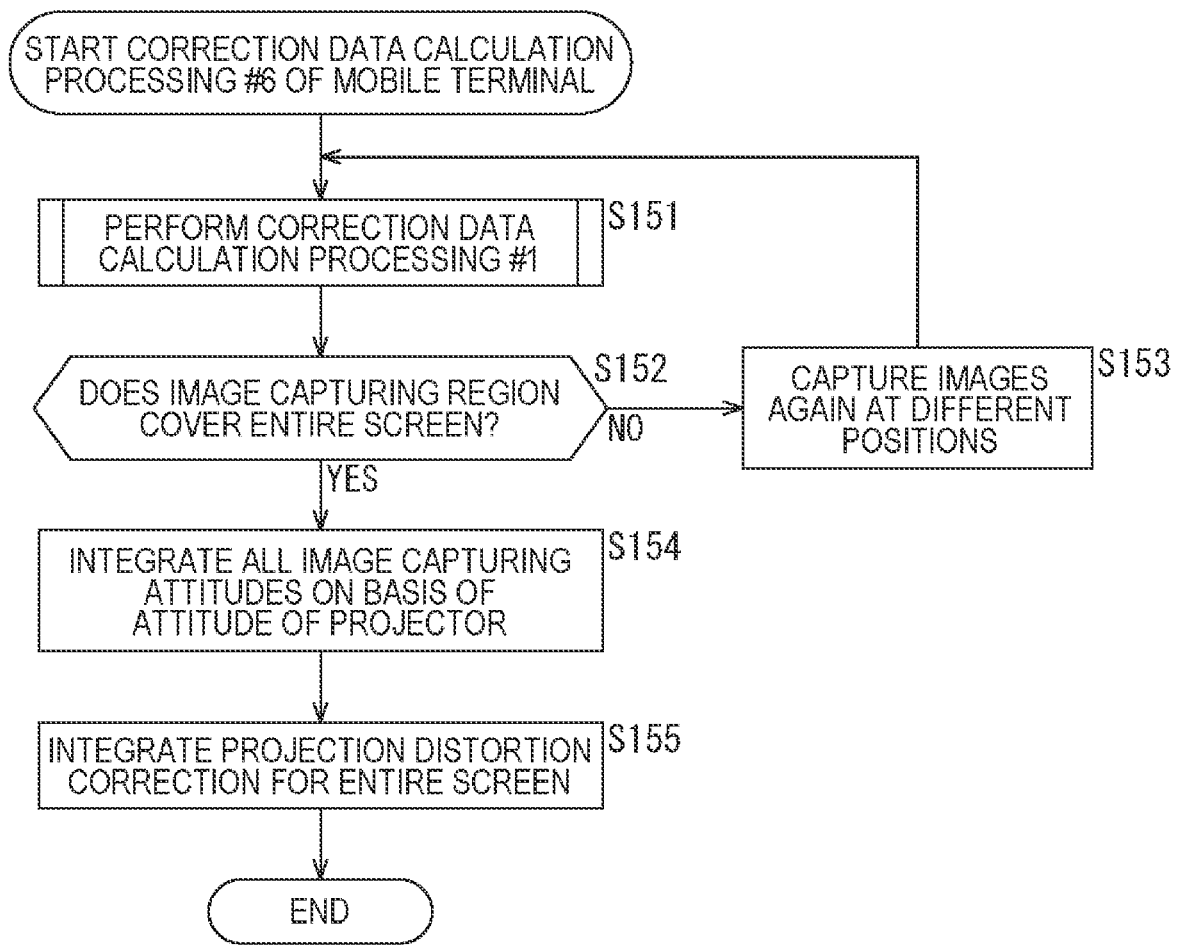
FIG. 33 is a flowchart for describing correction data calculation processing #6 of the mobile terminal.

The correction data calculation processing #6 of FIG. 33 is started, for example, when the projection distortion correction application is activated and the projector 2 projects the high-density pattern on the projection surface 3.

In step S151, the mobile terminal 1 performs processing similar to the correction data calculation processing #1 of FIG. 9.

In step S152, the correction vector generation unit 154 determines whether or not a range in which an image of the pattern has been captured covers the entire projection range (the entire projection surface 3).

In a case where it is determined in step S152 that the range in which the image of the pattern has been captured does not cover the entire projection range, the processing proceeds to step S153.

In step S153, the image capturing unit 131 captures an image of an image capturing region different from the already captured image capturing region a plurality of times at different positions, Thereafter, the processing returns to step S151, and the processing in step S151 and subsequent steps performed.

On the other hand, in a case where it is determined in step S152 that the range in which the image of the pattern has been captured covers the entire projection range, the processing proceeds to step S154.

In step S154, the correction vector Generation unit 154 integrates image capturing attitudes for all the captured images on the basis of the attitude of the projector 2.

In step S155, the correction vector generation unit 154 integrates the correction vectors generated for the respective projection regions, and generates correction data corresponding to the entire projection range.

By the above processing, even in a case where the angle of view of the camera 109 is narrow and the entire projection range cannot be shown in one captured image, the mobile terminal 1 can generate the correction data for the entire projection range.

Others

System Configuration

Among the image capturing unit 131, the captured image analysis unit 132, the image correction unit 142, and the projection control unit 143, the image capturing unit 131 and the captured image analysis unit 132 are provided in the mobile terminal 1, and the image correction unit 142 and the projection control unit 143 are provided in the projector 2 (FIG. 7). However, the captured image analysis unit 132 and the image correction unit 142 may be provided in any of the devices.

That is, the image capturing unit 131, the captured image analysis unit 132, and the image correction unit 142 can be provided in the mobile terminal 1, and the projection control unit 143 can be provided in the projector 2. In this case, a corrected image generated by the image correction unit 142 of the mobile terminal 1 performing geometric correction is transmitted to the projector 2 and projected by the projection control unit 143.

Furthermore, the image capturing unit 131 can be provided in the mobile terminal 1, and the captured image analysis unit 132, the image correction unit 142, and the projection control unit 143 can be provided in the projector 2. In this case, a captured image that has been captured by the image capturing unit 131 of the mobile terminal 1 and in which the dot pattern or the like is shown is transmitted to the projector 2 and used for generation of correction data.

As described above, the system configuration can be arbitrarily changed.

Program

The above-described series of processing can be executed by hardware or software. In a case where the series of processing is executed by software, a program constituting the software is installed in a computer incorporated in dedicated hardware, a general-purpose personal computer, or the like.

The program to be installed is provided by being recorded on the removable medium 113 illustrated in FIG. 5 including an optical disk (compact disc-read only memory (CD-ROM), digital versatile disc (DVD), or the like), a semiconductor memory, and the like. Furthermore, the program to be installed may also be provided via a wired or wireless transmission medium such as a local area network, the Internet, or digital broadcasting. The program can be installed in the ROM 102 or the memory 110 in advance.

Note that the program executed by the computer may be a program in which processing is performed in time series in the order described in the present specification, or may be a program in which processing is performed in parallel or at a necessary timing such as when a call is made.

Note that, in the present specification, a system means a set of a plurality of components (devices, modules (parts), and the like), and it does not matter whether or not all the components are in the same housing. Therefore, a plurality of devices housed in separate housings and connected via a network, and one device in which a plurality of modules is housed in one housing are both systems.

Note that the effects described in the present specification are merely examples and are not limited, and other effects may be obtained.

Embodiments of the present technology are not limited to the above-described embodiments, and various modifications can be made without departing from the gist of the present technology.

For example, the present technology can have a configuration of cloud computing in which one function is shared and processed in cooperation by a plurality of devices via a network.

Furthermore, each step described in the above-described flowcharts can be executed by one device or shared and executed by a plurality of devices.

Moreover, is a case where one step includes a plurality of sets of processing, the plurality of sets of processing included in the one step can be executed by one device or shared and executed by a plurality of devices.

Combination Examples of Configurations

The present technology can have the following configurations.

(1)

An information processing device including:
  a detection unit that detects corresponding points on a projection image and a plurality of captured images on the basis of the projection image and the plurality of captured images, the projection image being projected on a projection surface by a projection device, the plurality of captured images having been obtained by image capturing of the projection image at a plurality of image capturing positions;
  an estimation unit that estimates image capturing parameters including the plurality of image capturing positions and attitudes during image capturing at each of the image capturing positions and projection parameters including a position and an attitude of the projection device on the basis of corresponding point information indicating a relationship between the corresponding points;
  a generation unit that generates correction data used for geometric correction of an input image on the basis of the corresponding point information, the image capturing parameters, and the projection parameters; and
  a transmission unit that transmits the correction data.

(2)

The information processing device according to (1), in which
  the correction data is information used in the projection device, and
  the transmission unit transmits the correction data to the projection device.

(3)

The information processing device according to (1) or (2), further including
  a capturing unit that captures an image of the projection image projected on the projection surface by the projection device.

(4)

The information processing device according to any of (1) to (3), in which
  the number of the captured images is three or more.

(5)

The information processing device according to (1), in which
  the detection unit detects the corresponding points on an added captured image in a case where an estimation error of the projection surface obtained on the basis of the image capturing parameters is larger than a threshold value.

(6)

The information processing device according to (5), in which
  the estimation unit switches a combination of the plurality of captured images and estimates the image capturing parameters.

(7)

The information processing device according to (6), in which
  the estimation unit selects the combination of the captured images used for generation of the correction data on the basis of the estimation error of the projection surface or on the basis of dispersion of image capturing angles, the estimation error having been obtained on the basis of the image capturing parameters.

(8)

The information processing device according to (1), in which
  the estimation unit estimates image capturing parameters of an added captured image on the basis of an image capturing parameter common to the captured images.

(9)

The information processing device according to any of (1) to (8), further including
  a guide control unit that outputs information serving as a guide for the image capturing positions on the basis of the image capturing parameters.

(10)

The information processing device according to (9), in which
  the guide control unit displays a position different from the image capturing positions at which image capturing has already been performed.

(11)

The information processing device according to (10), in which
  the detection unit detects the corresponding points by use of a captured image obtained by image capturing at the position different from the image capturing positions at which image capturing has already been performed.

(12)

The information processing device according to (9), in which
  the guide control unit outputs information used to designate a predetermined position on the projection surface, and
  the information processing device further includes a determining unit that determines an image capturing position causing an estimation error at the designated position on the projection surface.

(13)

The information processing device according to (12), in which
  the detection unit detects the corresponding points by use of a captured image obtained by performing image capturing again using a position different from the determined image capturing position as an image capturing position.

(14)

The information processing device according to (9) in which,
the guide control unit outputs information used to designate a predetermined position on the projection surface, and
the transmission unit transmits, to the projection device, information indicating that another pattern having a higher density than a density of a pattern projected as the projection image is projected in a predetermined range including the designated position on the projection surface.

(15)

The information processing device according to (14), in which
the detection unit detects the corresponding points by use of a captured image obtained by image capturing of the projected another pattern.

(16)

The information processing device according to any of (1) to (15), in which
the detection unit detects the corresponding points on the basis of each of a plurality of captured images obtained by image capturing of a projection image projected is each of a plurality of projection regions obtained by division of the entire projection surface, and
the generation unit integrates a plurality of pieces of the correction data generated for the respective projection images.

(17)

An information processing method performed by an information processing device, the information processing method including:
detecting corresponding points on a projection image and a plurality of captured images on the basis of the projection image and the plurality of captured images, the projection image being projected on a projection surface by a projection device, the plurality of captured images having been obtained by image capturing of the projection image at a plurality of image capturing positions;
estimating image capturing parameters including the plurality of image capturing positions and attitudes during image capturing at each of the image capturing positions and projection parameters including a position and an attitude of the projection device on the basis of corresponding point information indicating a relationship between the corresponding points;
generating correction data used for geometric correction of an input image on the basis of the corresponding point information, the image capturing parameters, and the projection parameters; and transmitting the correction data.

(18)

A program for causing a computer to execute processing including:
detecting corresponding points on a projection image and a plurality of captured images on the basis of the projection image and the plurality of captured images, the projection image being projected on a projection surface by a projection device, the plurality of captured images having been obtained by image capturing of the projection image at a plurality of image capturing positions;
estimating image capturing parameters including the plurality of image capturing positions and attitudes during image capturing at each of the image capturing positions and projection parameters including a position and an attitude of the projection device on the basis of corresponding point information indicating a relationship between the corresponding points;
generating correction data used for geometric correction of an input image on the basis of the corresponding point information, the image capturing parameters, and the projection parameters; and
transmitting the correction data.

(19)

A projection device including:
a projection unit that projects a projection image on a projection surface;
a reception unit that receives correction data used for geometric correction of an input image, the correction data having been transmitted from an information processing device that detects corresponding points on the projection image and a plurality of captured images obtained by image capturing of the projection image at a plurality of image capturing positions on the basis of the projection image and the plurality of captured images, estimates image capturing parameters including the plurality of image capturing positions and attitudes during image capturing at each of the image capturing positions and projection parameters including a position and an attitude of the projection device on the basis of corresponding point information indicating a relationship between the corresponding points, and generates the correction data on the basis of the corresponding point information, the image capturing parameters, and the projection parameters; and
a generation unit that performs the geometric correction on the input image on the basis of the correction data and generates a corrected image.

(20)

An information processing system including:
an information processing device including
a detection unit that detects corresponding points on a projection image and a plurality of captured images on the basis of the projection image and the plurality of captured images, the projection image being projected on a projection surface by a projection device, the plurality of captured images having been obtained by image capturing of the projection image at a plurality of image capturing positions,
an estimation unit that estimates image capturing parameters including the plurality of image capturing positions and attitudes during image capturing at each of the image capturing positions and projection parameters including a position and an attitude of the projection device on the basis of corresponding point information indicating a relationship between the corresponding points,
a generation unit that generates correction data used for geometric correction of an input image on the basis of the corresponding point information, the image capturing parameters, and the projection parameters, and
a transmission unit that transmits the correction data; and
the projection device including
a projection unit that projects the projection image on the projection surface,
a reception unit that receives the correction data transmitted from the information processing device, and a generation unit that performs the geometric correction on the input image on the basis of the correction data and generates a corrected image.

REFERENCE SIGNS LIST

1 Mobile terminal
2 Projector
131 Image capturing unit
132 Captured image analysis unit
133 Transmission unit
134 Guide control unit
141 Reception unit
142 Image correction unit
143 Projection control unit
151 Corresponding point detection unit
152 Camera attitude estimation unit
153 Projector attitude estimation unit
154 Correction vector generation unit
171 Distortion occurrence cause determining unit

The invention claimed is:

1. An information processing device comprising:
a detection unit configured to detect corresponding points on a projection image and a plurality of captured images on a basis of the projection image and the plurality of captured images, the projection image being projected on a projection surface by a projection device, the plurality of captured images having been obtained by image capturing of the projection image at a plurality of image capturing positions;
an estimation unit configured to estimate image capturing parameters including the plurality of image capturing positions and attitudes during image capturing at each of the image capturing positions and projection parameters including a position and an attitude of the projection device on a basis of corresponding point information indicating a relationship between the corresponding points;
a guide control unit configured to output information serving as a guide for the plurality of image capturing positions;
a generation unit configured to generate correction data used for geometric correction of an input image on a basis of the corresponding point information, the image capturing parameters, and the projection parameters; and
a transmission unit configured to transmit the correction data,
wherein the detection unit, the estimation unit, the guide control unit, the generation unit, and the transmission unit are each implemented via at least one processor.

2. The information processing device according to claim 1, wherein
the correction data is information used in the projection device, and
the transmission unit transmits the correction data to the projection device.

3. The information processing device according to claim 1, further comprising:
a capturing unit configured to capture an image of the projection image projected on the projection surface by the projection device.

4. The information processing device according to claim 1, wherein
the number of the captured images is three or more.

5. The information processing device according to claim 1, wherein
the detection unit detects the corresponding points on an added captured image in a case where an estimation error of the projection surface obtained on a basis of the image capturing parameters is larger than a threshold value.

6. The information processing device according to claim 5, wherein
the estimation unit switches a combination of the plurality of captured images and estimates the image capturing parameters.

7. The information processing device according to claim 6, wherein
the estimation unit selects the combination of the captured images used for generation of the correction data on a basis of the estimation error of the projection surface or on a basis of dispersion of image capturing angles, the estimation error having been obtained on a basis of the image capturing parameters.

8. The information processing device according to claim 1, wherein
the estimation unit estimates image capturing parameters of an added captured image on a basis of an image capturing parameter common to the captured images.

9. The information processing device according to claim 1,
wherein the guide control unit outputs the information serving as the guide for the image capturing positions on a basis of the image capturing parameters.

10. The information processing device according to claim 9, wherein
the guide control unit displays a position different from the image capturing positions at which image capturing has already been performed.

11. The information processing device according to claim 10, wherein
the detection unit detects the corresponding points by use of a captured image obtained by image capturing at the position different from the image capturing positions at which image capturing has already been performed.

12. The information processing device according to claim 9, wherein
the guide control unit outputs information used to designate a predetermined position on the projection surface, and
the information processing device further comprises a determining unit that determines an image capturing position causing an estimation error at the designated position on the projection surface.

13. The information processing device according to claim 12, wherein
the detection unit detects the corresponding points by use of a captured image obtained by performing image capturing again using a position different from the determined image capturing position as an image capturing position.

14. The information processing device according to claim 9, wherein
the guide control unit outputs information used to designate a predetermined position on the projection surface, and
the transmission unit transmits, to the projection device, information indicating that another pattern having a higher density than a density of a pattern projected as the projection image is projected in a predetermined range including the designated position on the projection surface.

15. The information processing device according to claim 14, wherein
the detection unit detects the corresponding points by use of a captured image obtained by image capturing of the projected another pattern.

16. The information processing device according to claim 1, wherein
the detection unit detects the corresponding points on a basis of each of a plurality of captured images obtained by image capturing of a projection image projected in each of a plurality of projection regions obtained by division of the entire projection surface, and
the generation unit integrates a plurality of pieces of the correction data generated for the respective projection images.

17. An information processing method performed by an information processing device, the information processing method comprising:
detecting corresponding points on a projection image and a plurality of captured images on a basis of the projection image and the plurality of captured images, the projection image being projected on a projection surface by a projection device, the plurality of captured images having been obtained by image capturing of the projection image at a plurality of image capturing positions;
estimating image capturing parameters including the plurality of image capturing positions and attitudes during image capturing at each of the image capturing positions and projection parameters including a position and an attitude of the projection device on a basis of corresponding point information indicating a relationship between the corresponding points;
outputting information serving as a guide for the plurality of image capturing positions;
generating correction data used for geometric correction of an input image on a basis of the corresponding point information, the image capturing parameters, and the projection parameters; and
transmitting the correction data.

18. A non-transitory computer-readable storage medium having embodied thereon a program, which when executed by a computer causes the computer to execute a processing method, the processing method comprising:
detecting corresponding points on a projection image and a plurality of captured images on a basis of the projection image and the plurality of captured images, the projection image being projected on a projection surface by a projection device, the plurality of captured images having been obtained by image capturing of the projection image at a plurality of image capturing positions;
estimating image capturing parameters including the plurality of image capturing positions and attitudes during image capturing at each of the image capturing positions and projection parameters including a position and an attitude of the projection device on a basis of corresponding point information indicating a relationship between the corresponding points;
outputting information serving as a guide for the plurality of image capturing positions;
generating correction data used for geometric correction of an input image on a basis of the corresponding point information, the image capturing parameters, and the projection parameters; and
transmitting the correction data.

19. A projection device comprising:
a projection unit configured to project a projection image on a projection surface;
a reception unit configured to
receive correction data used for geometric correction of an input image, the correction data having been transmitted from an information processing device that detects corresponding points on the projection image and a plurality of captured images obtained by image capturing of the projection image at a plurality of image capturing positions on a basis of the projection image and the plurality of captured images,
estimate image capturing parameters including the plurality of image capturing positions and attitudes during image capturing at each of the image capturing positions and projection parameters including a position and an attitude of the projection device on a basis of corresponding point information indicating a relationship between the corresponding points, and
generate the correction data on a basis of the corresponding point information, the image capturing parameters, and the projection parameters;
a guide control unit configured to output information serving as a guide for the plurality of image capturing positions; and
a generation unit configured to perform the geometric correction on the input image on a basis of the correction data and generates a corrected image,
wherein the projection unit, the reception unit, the guide control unit, and the generation unit are each implemented via at least one processor.

20. An information processing system comprising:
an information processing device including
a detection unit configured to detect corresponding points on a projection image and a plurality of captured images on a basis of the projection image and the plurality of captured images, the projection image being projected on a projection surface by a projection device, the plurality of captured images having been obtained by image capturing of the projection image at a plurality of image capturing positions,
an estimation unit configured to estimate image capturing parameters including the plurality of image capturing positions and attitudes during image capturing at each of the image capturing positions and projection parameters including a position and an attitude of the projection device on a basis of corresponding point information indicating a relationship between the corresponding points,
a guide control unit configured to output information serving as a guide for the plurality of image capturing positions,
a first generation unit configured to generate correction data used for geometric correction of an input image on a basis of the corresponding point information, the image capturing parameters, and the projection parameters, and
a transmission unit configured to transmit the correction data; and
the projection device including
a projection unit that projects the projection image on the projection surface,
a reception unit that receives the correction data transmitted from the information processing device, and a second generation unit that performs the geometric correction on the input image on a basis of the correction data and generates a corrected image, wherein the detection unit, the estimation unit, the guide control unit, the first generation unit, the transmission unit, the projection unit, the reception unit, and the second generation unit are each implemented via at least one processor.

\* \* \* \* \*